(12) United States Patent
Behling et al.

(10) Patent No.: US 10,287,463 B2
(45) Date of Patent: May 14, 2019

(54) ADHESIVE INCLUDING PENDANT (METH)ACRYLOYL GROUPS, ARTICLE, AND METHOD

(71) Applicant: 3M INNOVATIVE PROPERTIES COMPANY, St. Paul, MN (US)

(72) Inventors: Ross E. Behling, Woodbury, MN (US); Albert I. Everaerts, Oakdale, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 99 days.

(21) Appl. No.: 14/442,178

(22) PCT Filed: Nov. 4, 2013

(86) PCT No.: PCT/US2013/068317
§ 371 (c)(1),
(2) Date: May 12, 2015

(87) PCT Pub. No.: WO2014/078115
PCT Pub. Date: May 22, 2014

(65) Prior Publication Data
US 2016/0289513 A1    Oct. 6, 2016

Related U.S. Application Data

(60) Provisional application No. 61/727,384, filed on Nov. 16, 2012.

(51) Int. Cl.
*B05D 3/06* (2006.01)
*C09J 133/08* (2006.01)
(Continued)

(52) U.S. Cl.
CPC ............ *C09J 133/066* (2013.01); *B05D 3/06* (2013.01); *C09J 133/08* (2013.01); *C09J 133/10* (2013.01);
(Continued)

(58) Field of Classification Search
None
See application file for complete search history.

(56) References Cited

U.S. PATENT DOCUMENTS 4,112,177 A * 9/1978 Salditt .................... A61L 15/58
427/208.8
4,912,169 A    3/1990 Whitmire
(Continued)

FOREIGN PATENT DOCUMENTS

| CN | 101864248 | 10/2010 |
|---|---|---|
| EP | 1505583 | 2/2005 |

(Continued)

OTHER PUBLICATIONS

International Search Report for PCT International Application No. PCT/US2013/068317 dated Feb. 6, 2014, 4 pages.

*Primary Examiner* — Frank D Ducheneaux
(74) *Attorney, Agent, or Firm* — Jean A. Lown

(57) ABSTRACT

An adhesive including a (meth)acrylate copolymer having pendant (meth)acryloyl groups, wherein the (meth)acrylate copolymer has a weight average molecular weight of 50,000 Daltons to 600,000 Daltons and an average molecular weight between (meth)acryloyl groups equal to at least 6,000 Daltons.

14 Claims, 3 Drawing Sheets

(51) Int. Cl.
*C09J 133/14* (2006.01)
*C09J 133/26* (2006.01)
*C09J 133/10* (2006.01)
*C09J 7/40* (2018.01)
*C09J 133/06* (2006.01)
*C09J 201/02* (2006.01)

(52) U.S. Cl.
CPC .......... *C09J 133/14* (2013.01); *C09J 133/26* (2013.01); *C09J 201/02* (2013.01); *C09J 7/40* (2018.01); *C09J 2201/60* (2013.01); *C09J 2433/00* (2013.01)

(56) References Cited

U.S. PATENT DOCUMENTS

| | | | |
|---|---|---|---|
| 5,637,646 A | | 6/1997 | Ellis |
| 5,986,011 A | | 11/1999 | Ellis |
| 6,177,173 B1 | * | 1/2001 | Nelson ................. B32B 7/02 |
| | | | 156/250 |
| 6,332,291 B1 | | 12/2001 | Flosbach |
| 6,448,339 B1 | | 9/2002 | Tomita |
| 6,552,118 B2 | * | 4/2003 | Fujita .................... C08F 8/42 |
| | | | 106/287.1 |
| 6,558,790 B1 | * | 5/2003 | Holguin .................. C09J 4/00 |
| | | | 428/317.1 |
| 6,630,239 B2 | * | 10/2003 | Cernohous ............ C09J 121/00 |
| | | | 428/354 |
| 6,783,850 B2 | | 8/2004 | Takizawa |
| 6,939,911 B2 | | 9/2005 | Tosaki |
| 8,603,630 B2 | | 12/2013 | Takahashi |
| 2006/0142445 A1 | * | 6/2006 | Soerens ................. A61L 15/585 |
| | | | 524/236 |
| 2007/0036930 A1 | * | 2/2007 | Kontani .................... B32B 7/12 |
| | | | 428/40.1 |
| 2007/0191506 A1 | | 8/2007 | Lu |
| 2007/0218276 A1 | * | 9/2007 | Hiramatsu ............ C09J 7/0217 |
| | | | 428/354 |
| 2009/0082488 A1 | * | 3/2009 | Takeda .................. C08F 220/18 |
| | | | 522/182 |
| 2010/0028669 A1 | | 2/2010 | Habu |
| 2010/0129986 A1 | | 5/2010 | Kamiya |
| 2010/0239866 A1 | | 9/2010 | Matsumura |
| 2011/0125115 A1 | * | 5/2011 | Anders ................. A61F 5/445 |
| | | | 604/344 |
| 2012/0115976 A1 | | 5/2012 | Igarashi |
| 2012/0148837 A1 | * | 6/2012 | Kashio ...................... C09J 4/00 |
| | | | 428/355 AC |
| 2012/0172477 A1 | | 7/2012 | Huang |
| 2012/0214896 A1 | | 8/2012 | Igarashi |
| 2012/0277341 A1 | * | 11/2012 | Smith ....................... C08F 2/48 |
| | | | 522/64 |
| 2014/0302313 A1 | | 10/2014 | Suwa |

FOREIGN PATENT DOCUMENTS

| | | |
|---|---|---|
| EP | 1873175 | 1/2008 |
| EP | 2452992 | 5/2012 |
| JP | 2005-112966 | 4/2005 |
| WO | WO 2011/112508 | 9/2011 |

* cited by examiner

ADHESIVE INCLUDING PENDANT (METH)ACRYLOYL GROUPS, ARTICLE, AND METHOD

CROSS REFERENCE TO RELATED APPLICATIONS

This application is a national stage filing under 35 U.S.C. 371 of PCT/US2013/068317, filed Nov. 4, 2013, which claims priority to U.S. Provisional Application Nos. 61/783,219, filed Mar. 14, 2013 and 61/727,384, filed Nov. 16, 2012, the disclosures of which are incorporated by reference in their entireties herein.

BACKGROUND

There is a high demand for novel optically clear adhesives (OCA) for gap filling between an outer cover lens or sheet (based on glass, polyethylene terephthalate (PET), polycarbonate (PC), polymethyl methacrylate (PMMA), cyclic olefin copolymer, etc.) and an underlying display module of electronic display assembly. The presence of the OCA improves the performance of the display by reducing the refractive index mismatch between substrates and the air gap while also providing structural support to the assembly. Filling the gap with an index matching adhesive reduces sunlight and ambient light reflections inherent in the use of cover lenses or sheets. As a result, contrasts of conventional display panels are improved under ambient conditions.

During the manufacture of certain devices, such as liquid crystal displays (LCD), two rigid substrates, such as a LCD and a glass or polycarbonate lens, must be optically coupled by the OCA. Defects, such as patterns or creases introduced during the laminating process that also introduce stress and uneven pressures on the LCD, provide for unacceptable display appearance, often referred to as "mura." On the lens side, the OCAs typically also have to be able to completely fill in the sharper corners of the decorative ink steps. To minimize this effect with OCAs, autoclaving (a process that includes exposure to high pressure, high temperature and time to enhance the OCA bond quality of the initial lamination step) is frequently employed.

First generation OCAs easily filled the LCD gap and after some work were able to conform to a low black ink-step (about 25 µm). However, mobile devices are now being manufactured using ink printed cover glass with a larger white ink-step (about 70 µm) to which current OCAs cannot conform well. Thus, there is a need for a new generation of OCA that is able to withstand the high temperature, high humidity (HTHH) testing conditions, while still flowing enough at autoclave temperatures (40-80° C.) to cover the larger ink-step dimensions. Additionally, there is a need for OCAs that are acid-free to eliminate conductive trace corrosion (like in a touch sensor) that can result from acid migration from the OCA.

While liquid OCAs are in essence infinitely compliant prior to curing (and essentially only have viscous character), they are not always easy to handle during assembly and caution has to be taken to minimize curing-induced stresses in the display; especially because after fully curing many of these materials are highly elastic. In contrast, sheet-like OCAs are free of curing-induced stresses, but they are also visco-elastic materials that can have difficulties overcoming larger ink steps or avoiding lamination stress during assembly.

Recently, the OCA visco-elastic property balance has been shifting more and more toward viscous character, but this can create issues with die cutting, die cut stability, and liner release. A certain amount of stiffness is needed from the OCA film to easily die-cut to the incredibly narrow (less than 0.15 mm) dimensional specifications of the customer and to be delivered without oozing or denting during shipping.

Furthermore, in the manufacture of OCA films in a continuous (on-web) coating and UV curing process starting from monomers or monomer syrups, it is currently necessary to use 1000 mJ/cm$^2$ (or more) of UVA energy in order to prepare a highly cohesive adhesive film and to get high monomer conversion to polymer, or alternatively, less than 1000 mJ/cm$^2$ can be used but at the expense of product quality and increased residual monomer content.

SUMMARY

The present disclosure provides adhesives with pendant (meth)acryloyl groups. Such adhesives, prior to curing, have superior flow characteristics and relatively short stress relaxation times once laminated, for example. Thus, they are useful in a variety of applications, particularly as optically clear adhesives (OCAs) in display devices. Significantly, adhesives of the present disclosure can fill ink steps near or equal to their own thickness, and can reduce the lamination stresses that can cause mura in electronic display assembly.

In one embodiment, the present disclosure provides an adhesive that includes an uncured (meth)acrylate copolymer having pendant (meth)acryloyl groups and optional pendant hydroxyl groups, wherein the (meth)acrylate copolymer has a weight average molecular weight of 50,000 Daltons to 600,000 Daltons and an average molecular weight between (meth)acryloyl groups equal to at least 6,000 Daltons.

In one embodiment, the present disclosure provides an adhesive that includes an at least partially cured (i.e., a partially or fully cured) (meth)acrylate copolymer having pendant (meth)acryloyl groups and optional pendant hydroxyl groups, wherein the (meth)acrylate copolymer, prior to curing, has a weight average molecular weight of 50,000 to 600,000 Daltons and an average molecular weight between (meth)acryloyl groups of at least 6,000 Daltons.

In certain embodiments such adhesives can be pressure-sensitive adhesives, and in certain embodiments, such adhesives can be heat-activated adhesives. The pressure-sensitive adhesives are usually tacky at room temperature whereas the heat-activated adhesives tend to be non-tacky at room temperature but tacky at elevated temperatures. Typically, the adhesive includes a (meth)acrylate copolymer (having pendant (meth)acryloyl groups) compounded with a free-radical generating initiator.

The present disclosure also provides articles that include a substrate and an adhesive layer adjacent to the substrate, wherein the adhesive layer includes the adhesive described herein.

In one embodiment, the present disclosure provides an article that includes a substrate and an adhesive layer adjacent to the substrate. The adhesive layer includes a (meth)acrylate copolymer with pendant (meth)acryloyl groups, wherein the (meth)acrylate copolymer has a weight average molecular weight of 50,000 to 600,000 Daltons and an average molecular weight between (meth)acryloyl groups equal to at least 6,000 Daltons. The (meth)acrylate copolymer is uncured.

In another embodiment, the present disclosure provides an article that includes a substrate and an adhesive layer adjacent to the substrate. The adhesive layer includes a partially cured (meth)acrylate copolymer with pendant (meth)acryloyl groups, wherein prior to curing the (meth)

acrylate copolymer has a weight average molecular weight of 50,000 to 600,000 Daltons and an average molecular weight between (meth)acryloyl groups equal to at least 6,000 Daltons. In certain embodiments, the (meth)acrylate copolymer is fully cured.

In certain embodiments, the adhesive of the present disclosure is optically clear. Thus, articles of the present disclosure can be a laminate that includes an optically clear substrate (e.g., a film or a lens, or a substrate that forms part of a display unit (i.e., LCD, OLED, etc.)) and an optically clear adhesive layer adjacent to at least one major surface of the optically clear substrate. The articles can further include another substrate (e.g., permanently or temporarily attached to the adhesive of the present disclosure), another adhesive layer, or a combination thereof.

The present disclosure also provides methods of making an article as described herein.

In one embodiment, a method of preparing an adhesive article is provided that includes: providing a substrate; applying an adhesive layer adjacent to the substrate, the adhesive layer including a (meth)acrylate copolymer having pendant (meth)acryloyl groups and optionally pendant hydroxyl groups (typically compounded with a free-radical generating initiator), wherein the (meth)acrylate copolymer has a weight average molecular weight of 50,000 to 600,000 Daltons and an average molecular weight between (meth) acryloyl groups equal to at least 6,000 Daltons; optionally exposing the adhesive layer to an energy source (e.g., a source of thermal energy or actinic radiation) to form an at least partially cured copolymer, wherein after partially curing, the adhesive layer has a tan delta ($\delta$) of at least 0.5, as measured at 60° C. and with an angular frequency of 1 Radian/second.

In certain embodiments, applying an adhesive layer can involve applying a coating composition (including the (meth)acrylate copolymer and an optional solvent) to the substrate (e.g., in a continuous (on-web) coating process). Exposing the adhesive layer to an energy source can involve applying less than 1000 $mJ/cm^2$ (and often, less than 500 $mJ/cm^2$) of UVA irradiation to produce an adhesive article (e.g., a highly cohesive adhesive film).

In certain embodiments, a method can further include: applying a second substrate adjacent to the adhesive layer such that the adhesive layer is positioned between two substrates; and exposing the adhesive layer to an energy source (e.g., a source of thermal energy or actinic radiation) to cure (e.g., further cure, if already partially cured) the (meth)acrylate copolymer and reduce the tan delta of the adhesive, as measured at a fixed temperature above the Tg of the adhesive (preferably, at 60° C.) and with an angular frequency of 1 Radian/second, to a value below that of the adhesive prior to this exposing step. In certain embodiments, exposing the adhesive layer to an energy source comprises applying less than 1000 $mJ/cm^2$ (and often, less than 500 $mJ/cm^2$) (typically, of UVA radiation) to produce a fully cured (meth)acrylate copolymer.

Herein, "adjacent" can be used to refer to two materials, typically in the form of layers, that are in direct contact or that are separated by one or more other materials, such as primer or hard coating layers. Often, adjacent materials are in direct contact.

According to the Pressure-Sensitive Tape Council, pressure-sensitive adhesives (PSAs) are defined to possess the following properties: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). Materials that are merely sticky or adhere to a surface do not constitute a PSA; the term PSA encompasses materials with additional viscoelastic properties. PSAs are adhesives that satisfy the Dahlquist criteria for tackiness at room temperature and typically exhibit adhesion, cohesion, compliance, and elasticity at room temperature.

Heat-activated adhesives ("HAs") are defined as adhesives that are non-tacky at room temperature but that become temporarily tacky (i.e., are activated at an activation temperature) and are capable of bonding to a substrate at elevated temperatures. At or above this activation temperature, HAs have the same characteristics as PSAs (i.e., adhesion, cohesion, compliance, and elasticity). Heat-activated adhesives usually have a glass transition temperature ($T_g$) or melting point ($T_m$) above room temperature. When the temperature is elevated above the $T_g$ or $T_m$, the storage modulus usually decreases and the adhesive becomes tacky. In contrast, when the temperature is lowered below the $T_g$ or $T_m$, the storage modulus usually increases and the adhesive tack is reduced, although bonding strength is retained or increases.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of about 20° C. to about 25° C. or about 22° C. to about 25° C.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF EXEMPLARY EMBODIMENTS

Figure 1:
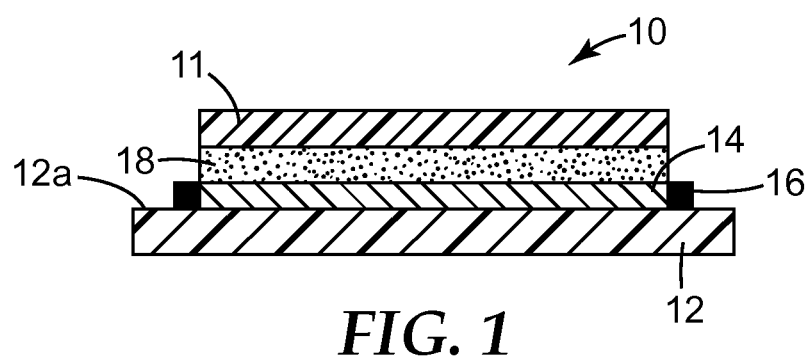
FIG. 1 is a cross-sectional view of an exemplary article according to the present disclosure.

The present disclosure provides adhesives with pendant (meth)acryloyl groups. Such adhesives can be used in a variety of applications, particularly as optically clear adhesives (OCAs) in electronic display assemblies (i.e., display devices).

In one embodiment, the present disclosure provides an adhesive that includes a (meth)acrylate copolymer having pendant (meth)acryloyl groups, wherein the (meth)acrylate copolymer has a weight average molecular weight of 50,000 Daltons to 600,000 Daltons and an average molecular weight between (meth)acryloyl groups equal to at least 6,000 Daltons.

This (meth)acrylate copolymer, typically with the addition of an initiator, is curable by actinic radiation and/or thermal energy in a controlled fashion to produce a partially or fully cured material. In other words, the curing reaction proceeds at a rate where it is possible to tune the curing level to the extent needed for the desired application or process step.

Significantly, an uncured, and particularly a partially cured, (meth)acrylate copolymer of the present disclosure can be converted and stored or shipped, yet still have additional latent cure available, for example, for a customer to activate once applied to a substrate (e.g., an electronic display). Thus, optionally, the (meth)acrylate copolymer of the present disclosure may be fully cured by the customer, or it can be fully cured in the manufacturing facilities to yield a more highly cohesive adhesive product.

In certain embodiments, this copolymer can be "A-staged" (partially cured) during manufacturing to yield a dimensionally and rheologically stable die cut. This "A-staged" intermediate can then be further cured, and typically fully cured in a "B-stage" during manufacturing or by a customer, for example, in an assembly process of a durable display module. The adhesive in its fully cured state can be very elastic, making adhesive residue removal during rework easy. Typically, at that stage the polymer is highly cohesive and thus it can be peeled off or stretch-removed (at low angle versus the plane of the display) from a substrate without leaving significant residue.

The uncured or partially cured (meth)acrylate copolymer of this adhesive combines the properties of high flowability needed during processing (e.g., lamination and autoclave steps typically carried out at elevated temperature (typically 40-80 degrees Celsius (° C.))), and the ability to tailor its cohesive strength and elongation upon coating (e.g., as a dry adhesive at room temperature) and curing of the polymer. This also allows for a unique combination of properties yielding adhesives with good converting (e.g., slitting or die cutting) characteristics and film-like behavior at room temperature, while retaining highly viscous character (and thus low elasticity and short stress relaxation times) at elevated temperature. As such, these materials approach the properties of a "liquid OCA in sheet format." This type of material is suitable for display assemblies because of its superior handling character combined with excellent flow during processing, which helps manage mura and successfully covers large ink steps with minimal risk for bubble formation. Further enhancements may be made by adjusting the glass transition and shear storage modulus (G') of the polymer, so the room temperature stiffness of the die cut can be improved. Because of this, in certain embodiments, such adhesives can be pressure sensitive, and in certain embodiments, such adhesives can be heat-activated adhesives.

The uncured (meth)acrylate copolymer of this adhesive has a weight average molecular weight (50,000 Daltons to 600,000 Daltons) and a level of reactive functionality (average molecular weight between (meth)acryloyl groups equal to at least 6,000 Daltons) balanced properly to provide desirable curable characteristics. These values apply to the uncured copolymer. The weight average molecular weight can be at least 50,000 Daltons, at least 75,000 Daltons, at least 100,000 Daltons, at least 125,000 Daltons, at least 150,000 Daltons, at least 175,000 Daltons, at least 200,000 Daltons, at least 225,000 Daltons, or at least 250,000 Daltons. The weight average molecular weight can be up to 600,000 Daltons, up to 550,000 Daltons, up to 500,000 Daltons, up to 450,000 Daltons, up to 400,000 Daltons, up to 350,000 Daltons, or up to 300,000 Daltons. The average molecular weight between (meth)acryloyl groups can be equal to at least 6,000 Daltons, at least 8,000 Daltons, at least 10,000 Daltons, at least 12,000 Daltons, at least 14,000 Daltons, at least 16,000 Daltons, at least 18,000 Daltons, at least 20,000 Daltons, at least 25,000 Daltons, at least 30,000 Daltons, at least 35,000 Daltons, at least 40,000 Daltons, at least 45,000 Daltons, or at least 50,000 Daltons. The average number of (meth)acryloyl groups per polymer is typically greater than 1 such as at least 1.2, at least 1.5, at least 2, at least 5, or at least 10.

Typically, molecular weights and reactive functionality levels outside these ranges result in materials that cure too fast, cure too slowly, do not cure at all, require too much energy to cure, are too viscous, are too elastic, and/or possess stress-relaxation times too long to effectively cover a high ink step or avoid mura in a display.

The (meth)acrylate copolymer of this adhesive has pendant (meth)acryloyl groups and optionally, pendant hydroxyl groups. This chemistry offers a unique curing mechanism that, in certain embodiments, appears to be independent of depth-of-cure challenges faced by current methods.

The average molecular weight between the pendant (meth)acryloyl groups is equal to at least 6,000 Daltons. This average molecular weight can be calculated by dividing the sum of (the mass of the precursor (meth)acrylate copolymer plus the mass of the unsaturated reagent compound) by the moles of (meth)acryloyl units. The moles of (meth)acryloyl are supplied by the unsaturated reagent compound.

As used herein, the term "(meth)acryloyl" group refers to group of formula $CH_2=CHR^1—(CO)—$ where $R^1$ is hydrogen or methyl. The (meth)acryloyl group is a methacryloyl group when $R^1$ is methyl and an acryloyl group when $R^1$ is hydrogen. The (meth)acryloyl group is often a (meth)acryloyloxy group of formula $CH_2=CHR^1—(CO)—O—$ or (meth)acryloylamido group of formula $CH_2=CHR^1—(CO)—NH—$.

As used herein, the "precursor (meth)acrylate copolymer" or "precursor" refers to the copolymer prior to reaction with the unsaturated reagent compound. The precursor typically has pendant hydroxyl groups (—OH groups) or pendant carboxylic acid groups (—COOH groups) that can react with the unsaturated reagent compound to produce the (meth)acrylate copolymer with pendant (meth)acryloyl groups.

As used herein, the term "unsaturated reagent compound" refers to a compound having a (meth)acryloyl group plus a group that is capable of reacting with the pendant hydroxyl group or pendant carboxylic acid group on the precursor (meth)acrylate copolymer to prepare the (meth)acrylate copolymer having pendant (meth)acryloyl groups.

The pendant (meth)acryloyl group is indirectly linked to the backbone of the (meth)acrylate copolymer through a linking group. The pendant group is typically of formula $CH_2=CHR^1—(CO)$-Q-L- where L is the linking group and Q is —O— or —NH—. The group L includes an alkylene, arylene, or combination thereof and can optionally further include —O—, —O(CO)—, —NH(CO)—, —NH—, or a combination thereof. Suitable alkylene groups (i.e., an alkylene is a divalent radical of an alkane) often have 1 to 10 carbon atoms, 1 to 6 carbon atoms, or 1 to 4 carbon atoms. Suitable arylene groups (i.e., an arylene is a divalent radical of a carboxylic aromatic compound) often have 6 to 12 carbon atoms, 6 to 10 carbon atoms, or 6 carbon atoms. The arylene is often phenylene.

In certain preferred embodiments, the (meth)acrylate copolymer is uncured. In certain preferred embodiments, the (meth)acrylate copolymer is fully cured. In certain preferred embodiments, the (meth)acrylate copolymer is partially cured. Such partial curing is often desirable to produce a dimensionally stable die cut article, for example.

In this context, an "uncured" (meth)acrylate copolymer means one that has been prepared from the polymerization of at least two different types of monomers, and functionalized with pendant (meth)acryloyl groups, but the copolymer has not been subjected to an energy source to cause a reaction between such pendant (meth)acryloyl groups (while in the presence of an initiator) and form a covalent link between them. In some examples, uncured copolymers are those having 0 to 5 percent of the pendant (meth)acryloyl groups reacted. That is, 95 to 100 percent of the pendant (meth)acryloyl groups remain unreacted.

In this context, a "partially cured" (meth)acrylate copolymer means one that is still capable of further reaction of the pendant (meth)acryloyl groups, with or without having to add new initiator. In other words, at least some, but not all, of the available pendant (meth)acryloyl groups have reacted (e.g., through free-radical cure), and some (i.e., greater than 5 percent), but not all (i.e., less than 75 percent), of the of the pendant (meth)acryloyl groups have been reacted by exposure to one or more energy sources (e.g., a source of thermal energy or actinic radiation, such as UV radiation). In certain embodiments, partially cured means greater than 5 percent, greater than 10 percent, or greater than 20 percent of the (meth)acryloyl groups have been reacted. In certain embodiments, partially cured means no more than 75 percent or no more than 70 percent of such groups have been reacted. If partially cured, the physical properties (such as modulus and tan delta, as determined from rheology tests) of the adhesive will change upon further exposure to the conditions used to cure the (meth)acrylate copolymer. In some examples, partially cured copolymers are those having greater than 5 to 75 weight percent of the pendant (meth) acryloyl groups reacted. That is, 25 to less than 95 percent of the pendant (meth)acryloyl groups remain unreacted.

In this context, a "fully cured" copolymer is one in which greater than 75 percent, and preferably all (meth)acryloyl groups have been consumed and further reaction is no longer possible. As curing progresses, the mobility of the cured polymeric material may be sufficiently low, however, that complete reaction of the remaining (meth)acryloyl groups is not possible. Once all groups capable of reacting have reacted, the physical properties (such as modulus and tan delta, as determined from rheology tests) of the adhesive no longer changes, even when further exposed to the conditions used to cure the (meth)acrylate copolymer. In some example, fully cured copolymers are those having greater than 75 to 100 percent of the pendant (meth)acryloyl groups reacted. That is, 0 to less than 25 percent of the pendant (meth)acryloyl groups remain unreacted. Preferably, the amount unreacted is as low as possible.

Also, adhesives of the present disclosure (whether uncured, partially cured, or fully cured) typically have no more than 10 weight percent (preferably, no more than 5 weight percent, and more preferably, no more than 2 weight percent) unpolymerized monomers (e.g., residual reactant monomers from the polymerization of at least two different types of monomers used to form the precursor (meth) acrylate copolymer or used as the unsaturated reagent compound), based on the total weight of the adhesive. In certain embodiments, adhesives of the present disclosure have substantially no monomers, particularly residual monomers. In this context, "substantially no" unpolymerized monomers means less than 1 weight percent or less than 0.5 weight percent, based on the total weight of the adhesive. To achieve such low residuals, a thorough vacuum stripping step or other method to remove residual monomers after polymerization of the (meth)acrylate copolymer may be required. In certain embodiments, the residual monomers include acid-containing monomers. Being free of such residual monomers makes the material more compatible with electronic applications where potentially migratory components are a concern.

Accordingly, in certain embodiments, the (meth)acrylate copolymer is applied "as is," i.e., without other added free or unpolymerized monomers for further polymerization with the copolymer, and without partial curing prior to being applied to a substrate.

Accordingly, adhesives of the present disclosure can be used in a variety of applications including both optics-related and non-optics-related applications. In general, adhesives of the present disclosure can be used in sheet-form, for example, in a wide variety of adhesive transfer tapes. Such adhesive transfer tapes can be made by coating an adhesive composition on a differential release liner, i.e., a double-sided release liner where both major surfaces of the liner contain a release coating and the release coatings are different. The adhesive is typically coated onto the side of the liner with the higher release value. After the adhesive composition is dried and/or cooled, the adhesive-coated release liner is wound into a roll to yield the transfer adhesive. When unwinding the adhesive transfer tape, the adhesive remains attached to the side of the liner with the higher release value. In use, the transfer adhesive is unwound and laminated to a substrate surface (e.g., such as those in optics-related devices as disclosed in greater detail below, or non-optics-related devices and articles such as painted panels, metal panels, window glass, automotive panels, etc.). The transfer adhesive has higher adhesion to the substrate surface than to the release liner and thus is transferred from the release liner to the substrate surface.

Adhesives of the present disclosure can also be in the form of an adhesive tape. In such embodiments, a conventional backing material such as, for example, paper (e.g., Kraft paper) or polymeric films such as polypropylene, polyethylene, polyurethane, polyester (e.g., polyethylene terephthalate), ethylene vinyl acetate, cellulose acetate, and ethyl cellulose. The backing materials can be in the form of a nonwoven web, extruded film, metal foil or sheet backing (for example, retro-reflective or graphic film sheets).

Turning to the figures, FIG. 1 depicts a cross-sectional view of an exemplary article 10 having a first substrate 12. Disposed on a first surface 12a of the substrate is an inorganic electro-conductive trace 14. The trace forms a grid or pattern on the first surface 12a. The trace does not completely cover the first surface 12a. That is, there are regions of the first substrate 12a exposed. The edges of the trace end at electrical connector pads 16.

Exemplary materials of substrate 12 include glass, polyethylene terephthalate, cyclo-olefin copolymer, polycarbonate, cellulose triacetate, polymethyl methacrylate, or another polyacrylate. In certain embodiments, the substrate is, or is part of, a lens, a touch sensor, a light emissive display, a light reflective display, or a polarizer film, for example.

Exemplary materials used to produce the inorganic electro-conductive trace 14 include silver, indium tin oxide, doped ZnO, and antimony tin oxide. These electro-conductive traces may also be made from silver or silver nanowires. The electro-conductive traces can be contacted with other electro-conductive traces such as circuits prepared from copper or silver. These circuits, at least in some articles, can also be in direct contact with the adhesive.

As shown in FIG. 1, an adhesive 18 of the present disclosure is adjacent to the trace 14. Because the trace is in a grid format, a portion of the adhesive 18 may be in direct contact with the first surface 12a of the first substrate 12. The adhesive 18 is typically disposed in a layer, on at least a portion of the surface 12a of the substrate 12 and the inorganic electro-conductive trace 14. The thickness of the adhesive layer 18 is sufficient to completely cover the trace. The thickness may not be uniform across its entire surface, as there may be depressions or valleys between the traces.

Although not shown in FIG. 1, in certain embodiments, the inorganic electro-conductive trace may have a thin barrier (protective) layer disposed thereon (not shown), in which case the adhesive 18 will not directly contact the trace. Such protective material may include sputtered silicon dioxide or silicon carbide, or a highly cured acrylate or epoxy based hard coating.

Optionally, the embodiment includes a second substrate 11 disposed on the adhesive 18. In certain embodiments, the first substrate and second substrate, if used, are optical substrates.

Exemplary optical substrates include (or are included in as a part of) a display panel, such as liquid crystal display, an OLED display, a touch panel, electrowetting display or a cathode ray tube, a window or glazing, an optical component such as a reflector, polarizer, diffraction grating, mirror, or cover lens, or another film such as a decorative film or optical film. In some embodiments, the optical substrates can be optically clear.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins (e.g., polyethylenes, polypropylenes, and cyclic olefin copolymers), and cellulose triacetates. Typically, cover lenses can be made of glass, poly(methyl methacrylates), or polycarbonate.

Figure 2:
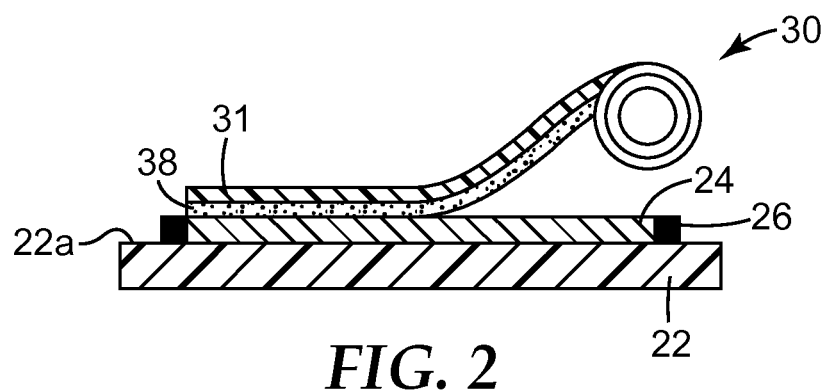
FIG. 2 is a schematic view of an exemplary method of making an article according to the present disclosure.

FIG. 2 depicts a schematic view of an exemplary process of making an article of FIG. 1. The process includes a step of providing a first substrate 22 having a first surface 22a. An inorganic electro-conductive trace 24 with electrical connector pads 26 is disposed on the first surface 22a. A roll of transfer tape 30 is provided. The roll of transfer tape 30 includes an adhesive 38 of the disclosure coated on a liner 31. Optionally, the liner 31 includes release coatings allowing for the roll of tape to unwind. The transfer tape 30 is laminated to the first substrate 22 such that the adhesive 38 is in contact with the trace 24. Because the trace 24 does not completely cover the first surface 22a of the first substrate 22, the adhesive 38 is also in contact with the first surface 22a.

Typically, the liner 31 is removed and discarded and a second substrate can be laminated onto the adhesive 38. The second substrate (not shown in FIG. 2, and analogous to 11 in FIG. 1), if used, is typically optically clear. Examples of optically clear substrates are described herein. Upon lamination of the two substrates, a bond is typically formed without an air gap.

In certain embodiments, after applying the laminate, the adhesive 38 can be exposed to an energy source (e.g., a source of thermal energy or actinic radiation) to cure the (meth)acrylate copolymer by reacting the pendant (meth)acryloyl groups, building the molecular weight, and eventually fully curing the copolymer to a network that is more durable because of its higher cohesive strength and less viscous character. However, even the fully cured product is not so highly crosslinked that the material is brittle or friable at room temperature.

While FIG. 2 depicts the use of a transfer tape, the method can also be practiced using cut sheets or die cuts made from a transfer tape, for example. Also, in certain embodiments, the adhesive 38 can also include a second protective liner disposed thereon (not shown) on the surface opposite the liner 31.

Suitable liners include flexible backing materials conventionally used as a tape backing, optical film, or release liner. In general, any suitable flexible material can be used without specific limitations on its refractive index or optical clarity since it is removed and does not become part of the article that includes the display substrate. Typical examples of flexible backing materials used as tape backings that may be useful for the laminates described herein include those made of paper (e.g., Kraft paper) or polymeric films such as polypropylene, polyethylene, polyurethane, polyester (e.g., polyethylene terephthalate), ethylene vinyl acetate, cellulose acetate, and ethyl cellulose. Some flexible backings may have coatings. For example a release liner may be coated with a low adhesion component, such as a silicone-containing material or a fluorocarbon-containing material.

In certain embodiments, the adhesive of the present disclosure is a pressure-sensitive adhesive, and in certain embodiments, the adhesive is a heat-activated adhesive.

Typically, pressure-sensitive adhesives are partially cured prior to use, although this is not necessary for heat-activated adhesives.

During use, an adhesive of the present disclosure, typically in the form of a sheet material such as a laminate, is applied to a substrate, such as a substrate having an inorganic electro-conductive trace thereon or a glass lens with a printed border and heat is applied to help adhesive wetting and flow in a controlled manner. To wet and flow, it is advantageous for the adhesive to have a tan delta (tan δ) of at least 0.5 at the temperature of application when measured with an angular frequency of 1 Radian/second. During lamination, such temperature is typically room temperature to 80° C. At that point a second substrate is applied, and once assembled the adhesive can be further cured to get a durable bond. Further curing will result in a molecular weight and/or crosslink density increase as a result of reaction of the pendant (meth)acryloyl groups, and a drop in the tan delta, when observed at a temperature significantly above (e.g., greater than 40° C. above the Tg of the adhesive, compared to what it was prior to curing. However, even the fully cured (B-Stage) adhesive may still retain a tan delta of 0.5 or more.

Figure 3:
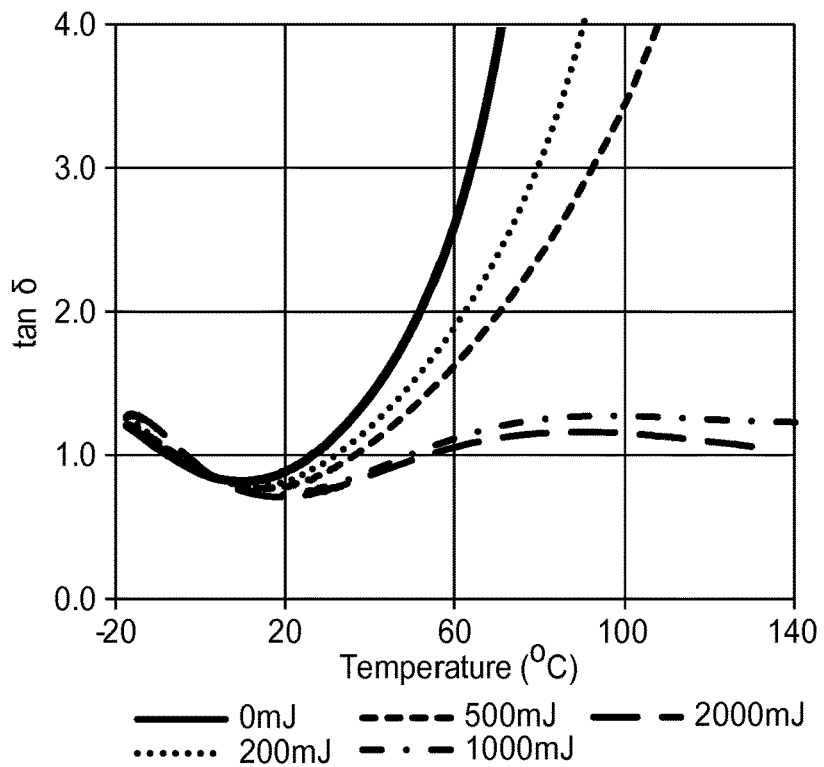
FIG. 3 is a graph illustrating the tan delta of an adhesive of the present disclosure under various conditions of exposure to UV radiation as the temperature varies.

This effect is demonstrated in FIG. 3, which shows a graph illustrating the change in tan delta (measured by DMA) of an adhesive of the present disclosure under various conditions of exposure to UV radiation as the temperature varies. In this embodiment, the adhesive has a Tg of approximately −20° C. (not shown). As shown in FIG. 3, the adhesive that is uncured (not exposed to UV radiation) or partially cured (exposed to small doses of UV radiation, e.g., 200 mJ, 500 mJ) has a higher tan delta, as measured at a fixed temperature that is above the adhesive's Tg (preferably, at 60° C.) compared to the tan delta of the adhesive that is more highly cured and typically fully cured (exposed to 1000 mJ or 2000 mJ). Also, the uncured or partially cured adhesive possesses a tan delta of at least 0.5, as measured at a fixed temperature that is above its Tg (preferably, at 60° C.). A fully cured (B-stage) adhesive may have a tan delta greater than, or less than, 0.5. This is further demonstrated by the data shown in FIG. 4, which is a graph illustrating the tan delta (measured by DMA) of an uncured and fully cured (B-Stage) adhesive of the present disclosure as the temperature varies.

Figure 5:
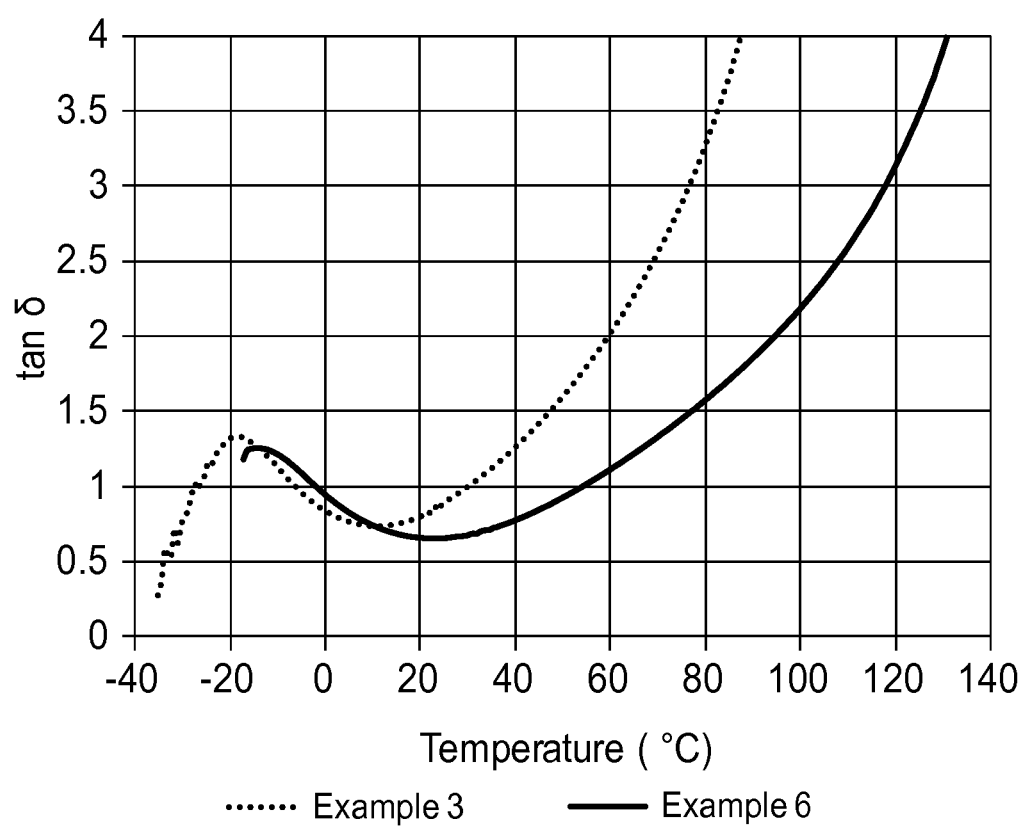
FIG. 5 is a graph of rheological curves of tan delta as a function of temperature for Examples 3 and 6.

To better understand the relationship between tan delta and Tg, FIG. 5 shows the rheological curves of tan delta as a function of temperature for Examples 3 and 6 using the dynamic mechanical analysis (DMA) method described in the Examples Section. As is well known in the art and can be seen in FIG. 5, the low temperature peaks of the tan delta correspond with the Tg's of the polymers. For Example 3, this occurs at −18.5° C. and for Example 6, this occurs at −14.5° C. The region of interest for viscous flow is reflected in the tan delta at much higher temperatures than the Tg on the plot (preferably as observed at 60° C. as a reference temperature, but in practice at the temperatures used for processing of the OCA during assembly (e.g., lamination and autoclave steps)). Thus, FIG. 5 shows a tan delta maximum around Tg (−18.5° C.) and a tan delta value in excess of 0.5 at the temperatures above the Tg (in this case exceeding a tan delta of 4.0 around 90° C.).

Typically, partially curing of the (meth)acrylate copolymer of the present disclosure is not needed for it to be useful as a heat-activated adhesive. Because the (meth)acrylate copolymer of the heat-activated adhesive is typically below its Tg at all times prior to use and thus has a high storage modulus, a "sheet" or "roll" laminate is typically dimensionally stable (i.e., no adhesive squeeze-out or oozing) even without partial curing it. In other words, the heat-activated sample can maintain dimensional stability as a result of its high modulus because, at room temperature, the heat activated (meth)acrylate copolymer is in its glassy state. This dimensional stability may be true also for a pressure-sensitive adhesive (PSA), but this is less likely since the material will be at or above its Tg during storage and shipping. So, in the case of a PSA, partial curing may be used to reduce flow and increase dimensional stability for storage and shipping.

In certain embodiments, the adhesives of the present disclosure are optically clear. Herein, "optically clear" means that a material (in a 50 micron thick layer) has an optical transmission value of at least 85 percent, preferably at least 90 percent. The term "optical transmission value" refers to the percentage of light that is not reflected back toward the source as a percentage of the total incident light at a wavelength of 400-700 nm (light intensity emitted/light intensity source×100).

Also, in certain embodiments, adhesives of the present disclosure (measured for a 50 micron thick layer) demonstrate less than 2 percent haze, preferably less than 1 percent. A small amount of haze may be desirable in certain situations, however. For example, the adhesives of the present disclosure can be used in a diffuse adhesive composition that includes light scattering particles (such as silica, or silicone (such as that available under the trade name TOSPEARL available from Momentive Performance Chemicals, Columbus, Ohio), in which case the haze will be greater than 2 percent.

Although, typically, adhesives of the present disclosure possess a neutral color (e.g., no added colorants such that the "a" and "b" values on the CIE LAB scale are below ±0.5), it may be desirable in certain situations to allow for some color for better color output, for example, from a display.

Also, in certain embodiments, adhesives of the present disclosure demonstrate good adhesion to a substrate, as may be used in a display stack. By this it is meant that the matrix has sufficient adhesion for a laminate that includes an adhesive of the present disclosure, a substrate (such a emissive or reflective display module, like an LCD, OLED, or electronic paper display, or touch sensor), and a second substrate (that is not a release liner, such as, for example, a lens) to pass the durability testing commonly used for electronic devices. Such durability testing typically includes three tests on separate samples of each material under evaluation: (test 1) exposure to 65° C. and 90 percent relative humidity; (test 2) exposure to 85° C. (no moisture added); and (test 3) temperature cycling (for example, −40° C. for 8 hours, ramp to 85° C. in one hour, hold for 8 hours at 85° C., and cool down in one hour to −40° C.). To "pass" each test, means that after 3 days of exposure to the listed conditions, the adhesive layer shows no signs of delamination or bubble formation.

Also, in certain embodiments, adhesives of the present disclosure demonstrate little or no change in the conductivity of an inorganic electro-conductive trace, if used thereon (e.g., as used in a touch sensor). Generally, when exposed for 21 days to 65° C. and 90 percent relative humidity, the adhesive in direct contact with the electro-conductive trace should not cause more than 20 percent change (preferably, there is no change) in the electrical resistance of the trace.

(Meth)Acrylate Copolymers

The (meth)acrylate copolymer of the present disclosure is formed from two or more different types of (meth)acrylate monomers (i.e., acrylate and/or methacrylate monomers).

The (meth)acrylate copolymer of the present disclosure includes pendant (meth)acryloyl groups and optional pendant hydroxyl groups.

In certain embodiments, the (meth)acrylate copolymer of the present disclosure is derived from one or more (meth) acrylic ester monomers (e.g., to control modulus and Tg of the final material), and one or more copolymerizable polar monomers, and optionally, one or more other monomers.

In certain embodiments, the (meth)acrylate copolymer of the present disclosure is derived from at least 50 parts by weight of a (meth)acrylic ester monomer, and at least 0.1 part by weight a copolymerizable polar monomer. In certain embodiments, the (meth)acrylate copolymer of the present disclosure is derived from no greater than 99 parts by weight or no greater than 95 parts by weight of a (meth)acrylic ester monomer, and no greater than 50 parts by weight or no greater than 30 parts by weight of a copolymerizable polar monomer. Other optional monomers can be used in an amount of 0 to 30 parts by weight or 0 to 10 parts by weight.

The (meth)acrylate monomers (i.e., (meth)acrylic acid ester monomers) can include aliphatic, cycloaliphatic, or aromatic groups. Useful (meth)acrylate monomers include linear or branched monofunctional acrylates or methacrylates of non-tertiary alkyl alcohols, the alkyl groups of which have from 1 up to 22 and, in particular, from 1 up to 18 carbon atoms. Useful monomers include, for example, 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, cyclohexyl (meth)acrylate, n-nonyl (meth)acrylate, isoamyl (meth)acrylate, n-decyl (meth)acrylate, isodecyl (meth)acrylate, dodecyl (meth)acrylate, isobornyl (meth) acrylate, isostearyl (meth)acrylate, behenyl (meth)acrylate, and 2-methylbutyl (meth)acrylate, and combinations thereof.

Other useful (meth)acrylate monomers include an aromatic group, include 2-phenoxyethyl acrylate (available under the trade name SR339, Sartomer, Exton, Pa.), 2-(phenylthio)ethyl acrylate (Cytec Ind., Woodland, N.J.), 2-phenylphenoxyethyl acrylate (Double Bond Chemical Ind. Co., Taipei, Taiwan), propionic acid (3-phenoxyphenyl)methyl ester (Miwon Chemical Co., Korea), 2-(biphenyl)ethyl acrylate (Toagosei, Japan), and combinations thereof.

Useful polar monomers typically include hydroxyl and/or carboxylic acid functionality, although other functional groups such as urethane, urea, or amide functionality can be useful as well. At least some of the polar monomers are typically selected to have a group capable of reacting with the unsaturated reagent compound to introduce pendant (meth)acryloyl groups.

Useful acid-functional monomers include acrylic acid, methacrylic acid, itaconic acid, and combinations thereof. Anhydrides, such as maleic anhydride and methacrylic acid anhydride can also be used. Useful hydroxyl-functional monomers typically have a hydroxyl equivalent weight of less than 400. The hydroxyl equivalent molecular weight is defined as the molecular weight of the monomeric compound divided by the number of hydroxyl groups in the monomeric compound. Useful monomers of this type include 2-hydroxyethyl acrylate and methacrylate, 3-hydroxypropyl acrylate and methacrylate, 2-hydroxypropyl acrylate and methacrylate, 4-hydroxybutyl acrylate and methacrylate, 2-hydroxyethylacrylamide, and 3-hydroxypropylacrylamide. Additionally, hydroxyl functional monomers based on glycols derived from ethylenoxide or propyleneoxide can also be used. An example of this type of monomer includes a hydroxyl terminated polypropylene glycol acrylate, available under the trade name BISOMER PPA 6 from Cognis, Germany. Various combinations of such monomers can be used, if desired.

Other optional monomers include monomers that when formed into homopolymers have a high glass transition temperature (Tg). Such monomers include, for example, (meth)acrylamide, N-isopropyl (meth)acrylamide, N,N-dimethyl (meth)acrylamide, N-octyl acrylamide, N,N-dimethylaminoethyl methacrylate, N-vinyl pyrrolidone, N-morpholino acrylate, diacetone (meth)acrylamide, N-vinyl lactams, vinyl esters (such as vinyl acetate), styrene, as well as high Tg macromers, such as those based on polymethylmethacrylate or polystyrene.

In certain embodiments, the (meth)acrylate monomer is selected from 2-ethylhexyl (meth)acrylate, methyl (meth) acrylate, ethyl (meth)acrylate, n-butyl (meth)acrylate, isobutyl (meth)acrylate, cyclohexyl (meth)acrylate, hexyl (meth) acrylate, n-octyl (meth)acrylate, isooctyl (meth)acrylate, isononyl (meth)acrylate, isobornyl (meth)acrylate, isostearyl (meth)acrylate, behenyl (meth)acrylate, 2-methylbutyl (meth)acrylate, and combinations thereof.

In certain embodiments, the polar monomer is a hydroxyl-functional monomer selected from 2-hydroxyethyl acrylate and methacrylate, 3-hydroxypropyl acrylate and methacrylate, 2-hydroxypropyl acrylate and methacrylate, 4-hydroxybutyl acrylate and methacrylate, 2-hydroxyethylacrylamide, 3-hydroxypropylacrylamide, and combinations thereof.

In certain embodiments, the optional monomers are selected from (meth)acrylamide, N-isopropyl (meth)acrylamide, N-octyl acrylamide, N-morpholino acrylate, diacetone (meth)acrylamide, vinyl acetate, styrene, and combinations thereof.

Precursor (meth)acrylate copolymers without the pendant (meth)acryloyl groups can be made by any conventional polymerization method (such as solution polymerization or emulsion polymerization) including thermal bulk polymerization under adiabatic conditions, as is disclosed in U.S. Pat. No. 5,637,646 (Ellis) and U.S. Pat. No. 5,986,011 (Ellis et al.).

An indirect, but preferred, method of incorporating pendant (meth)acryloyl groups into the precursor (meth)acrylate copolymer is to include among the monomer units of the copolymer some that include a reactive pendant functional group as described above in the polar monomers. These pendant reactive functional groups are reacted with unsaturated reagent compounds that include functional groups that are co-reactive with the reactive pendant functional group. When the two functional groups react, a molecule with pendant unsaturation results, i.e., the resulting copolymer will have pendant (meth)acryloyl groups. Generally, the reaction is between nucleophilic and electrophilic functional groups that react by a ring opening, addition, or condensation mechanism.

Using this "indirect method" of incorporating the pendent (meth)acryloyl groups, preferred reactive functional groups on the precursor (meth)acrylate copolymer include hydroxyl and acid groups. Where the pendant reactive functional group of the precursor includes a hydroxyl group, the co-reactive functional group of the unsaturated reagent compound preferably includes a carboxylic acid, isocyanato, epoxy, or anhydride group. Where the pendant reactive functional group of the precursor includes a carboxylic acid group, the co-reactive functional group preferably comprises a hydroxyl, amino, epoxy, isocyanate, aziridine, azetidine, or oxazolinyl group. When the pendant group of the precursor includes an anhydride, the co-reactive group can be hydroxyl or amine group.

In certain embodiments, the pendant (meth)acryloyl groups can be formed from the reaction between a hydroxyl group in the precursor (meth)acrylate copolymer and isocyanatoethyl acrylate or methacrylate. In certain embodiments, the pendant (meth)acryloyl groups can be formed from the reaction between a carboxylic acid in the precursor (meth)acrylate copolymer with glycidyl acrylate or methacrylate.

In yet another embodiment the pendant (meth)acryloyl group can be formed between an anhydride group in the precursor (meth)acrylate copolymer and a hydroxyl functional monomer, such as 2-hydroxethyl acrylate or methacrylate.

Although certain types of energy, e.g., e-beam, gamma, and excess heat may cure the (meth)acrylate copolymer of the present disclosure, it will typically need to be compounded with an initiator to cure using, e.g., UV radiation or heat. Thus, in certain embodiments, an adhesive that includes a (meth)acrylate copolymer of the present disclosure also includes an initiator. Suitable initiators are free-radical initiators (i.e., free-radical generating initiator), such as thermal initiators or photoinitiators. Various combinations of initiators can be included in adhesives of the present disclosure.

Examples of thermal initiators include various peroxides such as benzoyl peroxide, cyclohexane peroxide, lauroyl peroxide, di-tert-amyl peroxide, tert-butyl peroxy benzoate, di-cumyl peroxide, and peroxides commercially available from Atofina Chemical, Inc. (Philadelphia, Pa.) under the trade designation LUPERSOL (e.g., LUPERSOL 101, which is 2,5-bis(tert-butylperoxy)-2,5-dimethylhexane, and LUPERSOL 130, which is 2,5-dimethyl-2,5-di-(tert-butylperoxy)-3-hexyne); various hydroperoxides such as tert-amyl hydroperoxide and tert-butyl hydroperoxide; and azo compounds such as those available under the trade designation VAZO from E.I. du Pont de Nemours and Co. (Wilmington, Del.) including VAZO 67, which is 2,2'-azobis(2-methylbutane nitrile), VAZO 64, which is 2,2'-azobis(isobutyronitrile), VAZO 52, which is (2,2'-azobis(2,4-dimethylpentanenitrile), and VAZO 88, which is 1,1'-azobis(cyclohexanecarbonitrile); and V-601 from Wako Specialty Chemicals (Richmond, Va.), which is dimethyl-2,2'-azobisisobutyrate.

Examples of photoinitiators include those available under the trade designations IRGACURE 651 from BASF Corp. (Tarrytown, N.Y.), which is 2,2-dimethoxy-2-phenylacetophenone), LUCERIN-TPO-L from BASF Corp., and IRGACURE 184 from BASF Corp., which is 1-hydroxycyclohexyl phenyl ketone).

The (meth)acrylate copolymer can be inherently tacky. If desired, tackifiers can be added to the copolymer (or mixture of monomers prior to formation of the copolymer). Useful tackifiers include, for example, rosin ester resins, aromatic hydrocarbon resins, aliphatic hydrocarbon resins, and terpene resins. In general, light-colored tackifiers selected from hydrogenated rosin esters, terpenes, or aromatic hydrocarbon resins are preferred.

Low molecular weight (e.g., a Mw of 100,000 Daltons or less as determined by GPC) and high Tg (e.g., greater than 30° C.) polymers derived from (meth)acrylates can be combined with the (meth)acrylate copolymer. Suitable low molecular weight polymers are described, for example, in U.S. Pat. No. 6,783,850 (Takizawa et al.), U.S. Pat. No. 6,448,339 (Tomita), U.S. Pat. No. 4,912,169 (Whitmire et al.), and U.S. Pat. No. 6,939,911 (Tosaki et al.). These polymers can function as tackifiers.

Plasticizers may also be used to adjust the rheology of the adhesive composition. The plasticizers may be non-reactive compounds such as phosphate, adipate, and phthalate esters. Various low Tg (e.g., lower than 0° C.), lower molecular weight (e.g., a Mw of 100,000 Daltons or less as determined by GPC) acrylic polymers, prepared similarly to the acrylic tackifiers described above can also be used as plasticizers.

Further, multifunctional (meth)acrylate polymers such as polyethyleneglycol di(meth)acrylates, multifunctional (meth)acrylates derived from polyethers, and the like can also be compounded with the (meth)acrylate copolymers having pending (meth)acryloyl groups to adjust crosslinking density and compliance of the composition.

Other materials can be added to the adhesives (or monomer mixtures used in making the (meth)acrylate copolymers) of the present disclosure for special purposes, including, for example, oils, antioxidants, UV stabilizers, pigments, curing agents, chain-transfer agents, polymer additives, and other additives. In certain embodiments, it is desired that such additives do not significantly reduce the optical clarity of the adhesive. The identity and relative amounts of such optional components are well known to those skilled in the art.

For example, antioxidants and/or stabilizers such as hydroquinone monomethyl ether (p-methoxyphenol, MeHQ), and that available under the trade name IRGANOX 1010 (tetrakis(methylene(3,5-di-tert-butyl-4-hydroxyhydrocinnamate))methane) from BASF Corp., can be mixed into the (meth)acrylate copolymer to increase its temperature stability. If used, an antioxidant and/or stabilizer is typically used in the range of 0.01 percent by weight (weight percent) to 1.0 weight percent, based on the total weight of copolymer.

Chain-transfer agents which are well known in the polymerization art may also be included to control the molecular weight or other polymer properties. Suitable chain-transfer agents include, but are not limited to, those selected from the group of carbon tetrabromide, hexabromoethane, bromotrichloromethane, 2-mercaptoethanol, t-dodecylmercaptan, isooctylthioglycoate, 3-mercapto-1,2-propanediol, cumene, pentaerythritol tetrakis(3-mercapto butyrate) (available under the trade name Karenz MTh PEI from Showa Denko), ethylene glycol bisthioglycolate, and mixtures thereof. Depending on the reactivity of a particular chain-transfer agent and the amount of chain transfer desired, 0 to 5 weight percent can be used, based upon the total weight of monomer(s).

In many cases, free-radical polymerization of the monomers for preparation of the (meth)acrylate copolymer of the present disclosure can take place without solvents, i.e., true bulk polymerization where the copolymer formed, as well as the monomers themselves, are all miscible. However, the monomers may in some cases require a solvent. Useful solvents are those that are miscible in the mixture including, but not limited to, organic solvents such as toluene, hexane, pentane, isopropanol, and ethyl acetate. Solvents may also reduce the viscosity of the polymer at the end of the polymerization to facilitate draining or subsequent processing. If used, such solvents are present in an amount less than 10 weight percent and often in an amount less than 5 weight percent, based on the total weight of the reaction mixture. The solvent is typically removed prior to use of the copolymer.

Methods and Uses

Typically, to form an article of the present disclosure (e.g., transfer tape or laminate), an adhesive containing a (meth)

acrylate copolymer and other optional additives can be coated out of a solvent or from a melt. Such methods are well known to those of skill in the art. If processed out of a coating composition that includes a solvent, a suitable solvent is one that is miscible with the other components of the coating composition. By this it is meant that the coating composition remains homogeneous in diluted form and during drying such that there is no premature separation of the components out of the solvent. Also, a suitable solvent, if used, is one that dries quickly enough during the coating process to allow for immediate curing of the coating. And, a suitable solvent is one that does not damage the substrate to which the coating composition is applied (for example, it cannot cause crazing of a polymer film). Exemplary solvents include methyl ethyl ketone, methyl isobutyl ketone, 1-methoxy-2-propanol, isopropyl alcohol, toluene, ethyl acetate, butyl acetate, acetone, and the like, and mixtures thereof.

In certain embodiments, the adhesive is partially cured prior to use. In certain embodiments, very low ultraviolet dosages (e.g., less than 1000 mJ/cm$^2$, and often, less than 500 mJ/cm$^2$ of UVA radiation) are needed for curing to produce a cohesive adhesive, thereby reducing energy costs. As a result, reduced processing times can result due to increased line speeds in continuous (on-web) coating processes, further contributing to reduced manufacturing costs of a highly cohesive adhesive with substantially no residual monomers.

During use, the adhesive of the present disclosure can be applied to a substrate (e.g., a patterned substrate, a lens, a backing, or a display module) in a number of ways. It can be applied using a laminate that includes an adhesive of the present disclosure, as for example, demonstrated by FIG. 2. Alternatively, it can be applied out of a coating composition that includes the adhesive of the present disclosure and an optional solvent, or coated out of a melt, as described above.

In one method of preparing an adhesive article, the method includes: providing a substrate; applying an adhesive layer adjacent to the substrate, the adhesive layer comprising a (meth)acrylate copolymer having pendant (meth)acryloyl groups and optionally pendant hydroxyl groups, wherein the (meth)acrylate copolymer has a weight average molecular weight of 50,000 to 600,000 Daltons and an average molecular weight between (meth)acryloyl groups equal to at least 6,000 Daltons; and optionally exposing the adhesive layer to an energy source (e.g., using dosages less than 1000 mJ/cm$^2$, and often, less than 500 mJ/cm$^2$ of UVA radiation) to form an at least partially cured copolymer, wherein after partially curing, the adhesive layer has a tan delta ($\delta$) of at least 0.5, as measured at a fixed temperature above the Tg of the adhesive (preferably, at 60° C.) and with an angular frequency of 1 Radian/second.

The curing can occur at room temperature or at an elevated temperature. In some embodiments, the curing temperature is selected to be at least 20° C. higher than the glass transition temperature of the (meth)acrylate copolymer. The elevated temperature can enhance mobility of the materials and curing efficiency.

In certain embodiments, the copolymer is partially cured. In certain embodiments, the method includes applying a second substrate adjacent to the adhesive layer such that the adhesive is positioned between two substrates; and exposing the adhesive layer to an energy source (e.g., using heat or dosages less than 1000 mJ/cm$^2$, and often, less than 500 mJ/cm$^2$ of UVA radiation) to further cure the (meth)acrylate copolymer and reduce the tan delta of the adhesive, as measured at a fixed temperature (preferably, 60° C.), to a value below that of the adhesive prior to this exposing step.

If desired, the method can further include forming a second adhesive layer adjacent to at least one substrate. This second adhesive layer may be of the same composition as the first adhesive layer, or a different composition, including a conventional adhesive.

In certain embodiments, adhesives containing (meth)acrylate copolymers of the present disclosure are optically clear. Thus, certain articles can be laminates that include an optically clear substrate (e.g., a film) and an optically clear adhesive layer of the present disclosure adjacent to at least one major surface of the optical film or substrate. The articles can further include another substrate (e.g., permanently or temporarily attached to the adhesive of the present disclosure), another adhesive layer, or a combination thereof.

In embodiments of laminates in which an optically clear adhesive layer is positioned between two substrates, at least one of the substrates is an optical film, a display unit, a touch sensor, or a lens. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Films for the provided laminates can also include retarder plates such as quarter-wave and half-wave phase retardation optical elements. Other optically clear films include anti-splinter films and electromagnetic interference filters. The films may also be used as substrates for ITO coating or patterning, such as use those used for the fabrication of touch sensors.

In some embodiments, laminates that include an adhesive containing a (meth)acrylate copolymer of the present disclosure can be optical elements, or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, polarizing beam splitters, cathode ray tubes, ITO-coated touch sensors such as those using glass or clear plastic substrates, and reflectors.

In certain embodiments, an adhesive containing a (meth)acrylate copolymer of the present disclosure can be adjacent a conventional optically clear adhesive (for example, a crosslinked, solution polymerized and solvent-cast optically clear adhesive). In certain embodiments, a conventional optically clear adhesive can be sandwiched between two layers of adhesive containing a (meth)acrylate copolymer of the present disclosure. In yet another embodiment, two or more layers of the (meth)acrylate copolymer of the present disclosure can be adjacent to each other. Each of these layers may be different in composition (including a different choice of initiator), different in molecular weight, different in molecular weight between pendant (meth)acryloyl groups, or all of the above. For example by doing so, one layer may have different crosslink density from an adjacent layer, while all layers can be cured simultaneously. Similarly, one layer may be cured with one mechanism, while another layer may be cured with a different mechanism.

When an adhesive is laminated between a printed lens and a second display substrate, prevention of optical defects can be even more challenging because the adhesive may have to conform to a sometimes large ink step (i.e., 50-70 µm) and the total adhesive thickness acceptable in the display may only be 150-250 µm (or less). Completely wetting this large ink step during initial assembly is very important, because any trapped air bubbles may become very difficult to remove in the subsequent display assembly steps. Thus, a suitable adhesive should have sufficient compliance (for example, low shear storage modulus, G', at lamination temperature, typically 25° C., of less than $10^5$ Pascal (Pa) when measured at 1 Hz frequency) to enable good ink wetting, as well as quick deformation and compliance to the sharp edge of the ink step contour. A suitable adhesive should also have sufficient flow to not only comply with the ink step but also wet more completely to the ink surface. The flow of the adhesives of the present disclosure can be reflected in the high tan delta value of the material over a broad range of temperatures (e.g., tan δ of at least 0.5 between the glass transition temperature (Tg) of the adhesive (measured by DMA) and 60° C. or slightly higher).

The stress caused by the rapid deformation of an adhesive by the ink step requires the adhesive to respond much faster than the common stress caused by a coefficient of thermal expansion mismatch, such as in polarizer attachment applications where the stress can be relieved over hours instead of seconds or shorter. However, even those adhesives that can achieve this initial ink step wetting may still have too much elastic contribution from the bulk rheology and this can cause the bonded components to distort, which is not acceptable. Even if these display components are dimensionally stable, the stored elastic energy (due to the rapid deformation of the adhesive over the ink step) may find a way to relieve itself by constantly exercising stress on the adhesive, eventually causing failure. Thus, as in the case of liquid bonding of the display components, the design of an adhesive to successfully bond the display components requires a delicate balance of adhesion, optics, drop test tolerance, as well as compliance to high ink steps, and good flow even when the ink step pushes into the adhesive layer up to as much as 30 percent or more of its thickness. In certain embodiments, adhesives of the present disclosure demonstrate such balance of properties.

Various embodiments are provided that include adhesives, adhesive articles, and methods of making adhesive articles.

Embodiment 1 is an adhesive comprising a (meth)acrylate copolymer having pendant (meth)acryloyl groups and optional pendant hydroxyl groups, wherein the (meth)acrylate copolymer has a weight average molecular weight of 50,000 Daltons to 600,000 Daltons and an average molecular weight between (meth)acryloyl groups equal to at least 6,000 Daltons. Typically, 0 to 5 percent of the pendant (meth)acryloyl groups have reacted.

Embodiment 2 is an adhesive comprising an at least partially cured (meth)acrylate copolymer having pendant (meth)acryloyl groups and optional pendant hydroxyl groups, wherein the (meth)acrylate copolymer, prior to curing, has a weight average molecular weight of 50,000 to 600,000 Daltons and an average molecular weight between (meth)acryloyl groups of at least 6,000 Daltons. Stated differently, embodiment 2 is an adhesive comprising a (meth)acrylate copolymer that is at least partially cured, the (meth)acrylate copolymer having pendant (meth)acryloyl groups and optional pendant hydroxyl groups, wherein the (meth)acrylate copolymer, prior to curing, has a weight average molecular weight of 50,000 to 600,000 Daltons and an average molecular weight between (meth)acryloyl groups of at least 6,000 Daltons. In the partially cured (meth)acrylate copolymer, greater than 5 percent of the pendant (meth)acryloyl group have reacted. In some embodiments, greater than 25 percent, greater than 50 percent, or greater than 75 percent of the pendant (meth)acryloyl groups have reacted.

Embodiment 3 is the adhesive of embodiment 1 or 2 wherein the (meth)acrylate copolymer having pendant (meth)acryloyl groups also includes pendant hydroxyl groups.

Embodiment 4 is the adhesive of any one of embodiments 1 through 3 which is optically clear.

Embodiment 5 is the adhesive of any one of embodiments 1 through 4 further comprising a free radical initiator.

Embodiment 6 is the adhesive of embodiment 5 wherein the initiator is a photoinitiator.

Embodiment 7 is the adhesive of any one of embodiments 1 through 6 which has a tan δ of at least 0.5, as measured at a fixed temperature above the Tg of the adhesive (preferably, at a temperature of 60° C.) and with an angular frequency of 1 Radian/second.

Embodiment 8 is the adhesive of any one of embodiments 1 through 7 having 0-2 weight percent residual monomer, based on the total weight of the adhesive.

Embodiment 9 is the adhesive of any one of embodiments 1 through 8 which is a pressure-sensitive adhesive.

Embodiment 10 is the adhesive of any one of embodiments 1 through 8 which is a heat-activated adhesive.

Embodiment 11 is an article comprising a substrate and an adhesive layer adjacent to the substrate, the adhesive layer comprising the adhesive of any one of embodiments 1 through 10.

Embodiment 12 is an article comprising a substrate and an adhesive layer adjacent to the substrate, the adhesive layer comprising a (meth)acrylate copolymer comprising pendant (meth)acryloyl groups, wherein the (meth)acrylate copolymer has a weight average molecular weight of 50,000 to 600,000 Daltons and an average molecular weight between (meth)acryloyl groups equal to at least 6,000 Daltons. Typically, 0 to 5 percent of the pendant (meth)acryloyl groups have reacted.

Embodiment 13 is an article comprising a substrate and an adhesive layer adjacent to the substrate, the adhesive layer comprising a partially cured (meth)acrylate copolymer comprising pendant (meth)acryloyl groups, wherein prior to curing the (meth)acrylate copolymer has a weight average molecular weight of 50,000 to 600,000 Daltons and an average molecular weight between (meth)acryloyl groups equal to at least 6,000 Daltons. In the partially cured (meth)acrylate copolymer, greater than 5 percent of the pendant (meth)acryloyl group have reacted. In some embodiments, greater than 25 percent, greater than 50 percent, or greater than 75 percent of the pendant (meth)acryloyl groups have reacted.

Embodiment 14 is the article of embodiment 12 or 13 wherein the (meth)acrylate copolymer having pendant (meth)acryloyl groups also includes pendant hydroxyl groups.

Embodiment 15 is the article of any one of embodiments 12 to 14 wherein the (meth)acrylate copolymer having pendant (meth)acryloyl groups and optionally pendant hydroxyl groups is prepared from monomers comprising one or more (meth)acrylic ester monomers and one or more copolymerizable polar monomers.

Embodiment 16 is the article of any one of embodiments 12 to 15 wherein the (meth)acrylate copolymer having pendant (meth)acryloyl groups and optionally pendant hydroxyl groups is a reaction product of (a) a precursor (meth)acrylate copolymer having pendant hydroxyl groups, pendant carboxylic acid groups, or a combination thereof and (b) a unsaturated reagent compound having a (meth) acryloyl group and a group reactive with the pendant hydroxyl groups, pendant carboxylic acid groups, or a combination thereof in the precursor (meth)acrylate copolymer.

Embodiment 17 is the article of embodiment 15 or 16 wherein the (meth)acrylate copolymer having pendant (meth)acryloyl groups and optionally pendant hydroxyl groups (or the precursor (meth)acrylate copolymer) is prepared from monomers comprising a (meth)acrylate monomer, a polar monomer, and an optional monomer. The (meth)acrylate monomer is selected from 2-ethylhexyl (meth)acrylate, methyl (meth)acrylate, ethyl (meth)acrylate, n-butyl (meth)acrylate, isobutyl (meth)acrylate, cyclohexyl (meth)acrylate, hexyl (meth)acrylate, n-octyl (meth)acrylate, isooctyl (meth)acrylate, isononyl (meth)acrylate, isobornyl (meth)acrylate, isostearyl (meth)acrylate, behenyl (meth)acrylate, 2-methylbutyl (meth)acrylate, and combinations thereof. The polar monomer is selected from 2-hydroxyethyl acrylate and methacrylate, 3-hydroxypropyl acrylate and methacrylate, 2-hydroxypropyl acrylate and methacrylate, 4-hydroxybutyl acrylate and methacrylate, 2-hydroxyethylacrylamide, 3-hydroxypropylacrylamide, acrylic acid, methacrylic acid, itaconic acid, maleic anhydride, methacrylic acid anhydride, and combinations thereof. The optional monomer is selected from (meth) acrylamide, N-isopropyl (meth)acrylamide, N-morpholino acrylate, diacetone (meth)acrylamide, vinyl acetate, styrene, and combinations thereof.

Embodiment 18 is the article of any one of embodiments 12 through 17 which is optically clear.

Embodiment 19 is the article of any one of embodiments 12 through 18 further comprising a free radical initiator.

Embodiment 20 is the article of embodiment 19 wherein the initiator is a photoinitiator.

Embodiment 21 is the article of any one of embodiments 12 through 20 wherein the (meth)acrylate copolymer is fully cured.

Embodiment 22 is the article of any one of embodiments 12 through 21 wherein the adhesive has a tan δ of at least 0.5, as measured at a fixed temperature above the Tg of the adhesive (preferably, at a temperature of 60° C.) and with an angular frequency of 1 Radian/second.

Embodiment 23 is the article of any one of embodiments 12 through 22 which is in the form of a sheet.

Embodiment 24 is a method of preparing an adhesive article, the method comprising providing a substrate, applying an adhesive layer adjacent to the substrate, and optionally exposing the adhesive layer to an energy source to form an at least partially cured copolymer. The adhesive layer comprises a (meth)acrylate copolymer having pendant (meth)acryloyl groups and optionally pendant hydroxyl groups, wherein the (meth)acrylate copolymer has a weight average molecular weight of 50,000 to 600,000 Daltons and an average molecular weight between (meth)acryloyl groups equal to at least 6,000 Daltons. After at least partially curing, the adhesive layer has a tan delta (δ) of at least 0.5, as measured at a fixed temperature above the Tg of the adhesive (preferably, at 60° C.).

Embodiment 25 is the method of embodiment 24 wherein: applying an adhesive layer comprises applying a coating composition comprising the (meth)acrylate copolymer and an optional solvent to the substrate; removing the solvent, if used; and exposing the adhesive layer to a UV source comprising applying less than 1000 mJ/cm² (and often, less than 500 mJ/cm²) to at least partially cure and produce an adhesive article.

Embodiment 26 is the method of embodiment 24 or 25 further comprising: applying a second substrate adjacent to the adhesive layer such that the adhesive layer is positioned between two substrates; and exposing the adhesive layer to an energy source to cure (e.g., further cure, if already partially cured) the (meth)acrylate copolymer and reduce the tan delta of the adhesive, as measured at a fixed temperature above the Tg of the adhesive (preferably, at 60° C.), to a value below that of the adhesive prior to this exposing step.

Embodiment 27 is the method of claim 26 wherein exposing the adhesive layer to a UV source comprises applying less than 1000 mJ/cm² (and often, less than 500 mJ/cm²) to produce a fully cured (meth)acrylate copolymer.

Embodiment 28 is the method of any one of embodiments 24 through 27 further comprising forming a second adhesive layer adjacent to at least one substrate.

Embodiment 29 is the method of any one of embodiments 24 through 28 wherein the (meth)acrylate copolymer having pendant (meth)acryloyl groups and optionally pendant hydroxyl groups is prepared from monomers comprising one or more (meth)acrylic ester monomers and one or more copolymerizable polar monomers.

Embodiment 30 is the method of embodiment 29 wherein the (meth)acrylate copolymer having pendant (meth)acryloyl groups and optionally pendant hydroxyl groups is prepared from monomers comprising: a (meth)acrylate monomer selected from 2-ethylhexyl (meth)acrylate, methyl (meth)acrylate, ethyl (meth)acrylate, n-butyl (meth)acrylate, isobutyl (meth)acrylate, cyclohexyl (meth)acrylate, hexyl (meth)acrylate, n-octyl (meth)acrylate, isooctyl (meth)acrylate, isononyl (meth)acrylate, isobornyl (meth)acrylate, isostearyl (meth)acrylate, behenyl (meth)acrylate, 2-methylbutyl (meth)acrylate, and combinations thereof; a polar monomer selected from 2-hydroxyethyl acrylate and methacrylate, 3-hydroxypropyl acrylate and methacrylate, 2-hydroxypropyl acrylate and methacrylate, 4-hydroxybutyl acrylate and methacrylate, 2-hydroxyethylacrylamide, 3-hydroxypropylacrylamide, acrylic acid, methacrylic acid, itaconic acid, maleic anhydride, methacrylic acid anhydride, and combinations thereof; and an optional monomer selected from (meth)acrylamide, N-isopropyl (meth)acrylamide, N-octylacrylamide, N-morpholino acrylate, diacetone (meth)acrylamide, vinyl acetate, styrene, and combinations thereof.

Embodiment 31 is the method of any one of embodiments 24 through 30, wherein the (meth)acrylate copolymer having pendant (meth)acryloyl groups and optionally pendant hydroxyl groups is prepared by reacting a precursor (meth) acrylate copolymer having pendant hydroxyl groups, pendant carboxylic acid groups, or a combination thereof with a unsaturated reagent compound having a (meth)acryloyl group and a group that reacts with the pendant hydroxyl group, pendant carboxylic acid group, or combination thereof in the precursor (meth)acrylate copolymer.

Embodiment 32 is the method of embodiment 31 wherein the precursor (meth)acrylate copolymer has pendant hydroxyl groups and the unsaturated reagent compound is IEM.

Embodiment 33 is the method of embodiment 31 where the precursor (meth)acrylate copolymer has pendant carboxylic acid groups and the unsaturated reagent compound is GMA.

Embodiment 34 is an adhesive article prepared by the method of any one of embodiments 24 through 33.

Embodiment 35 is an adhesive of any one of embodiments 1 to 10 further comprising a tackifier, a plasticizer, or a combination thereof.

EXAMPLES

Objects and advantages of this disclosure are further illustrated by the following examples, but the particular materials and amounts thereof recited in these examples, as well as other conditions and details, should not be construed to unduly limit this disclosure.

As used herein, all parts and percentages are by weight unless otherwise specified. The term "pph" refers to the parts per 100 parts of a polymer mass. The pph is often based on the mass of the precursor polymer, which refers to the polymeric material prior to reaction with another monomer such as IEM or GMA to add pendant (meth)acryloyl groups.

Test Methods

Solids Content Test Method:

Duplicate samples were deposited into pre-weighed aluminum pans and subsequently dried at 105° C. for a minimum of 3 hours (or alternatively dried at 160° C. for 45 minutes under vacuum). Polymer solids content was an average of two samples which were gravimetrically analyzed relative to wet weight.

Determination of Molecular Weight Distribution

The molecular weight distribution of the compounds was characterized using conventional gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, available from Varian Inc. (Palo Alto, Calif., USA).

Samples of polymeric solutions were prepared by dissolving polymer or dried polymer materials in tetrahydrofuran at a concentration of 0.5 percent (weight/volume) and filtering through a 0.2 micron polytetrafluoroethylene filter that is available from VWR International (West Chester, Pa., USA). The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight (Mw) and the polydispersity index (weight average molecular weight divided by number average molecular weight) were calculated for each sample against this standard calibration curve.

Calculation of Average Molecular Weight Between (Meth) acryloyl Groups

The theoretical average molecular weight was calculated between the (meth)acryloyl groups (i.e., the average molecular weight between where the IEM or GMA reacted forming pendant acryloyl groups). When IEM was used to add the pendant (meth)acryloyl groups, the average molecular weight between (meth)acryloyl groups was calculated according to the following formula.

Average Molecular weight=(mass of precursor(meth) acrylate copolymer+mass of IEM)÷(moles of(meth)acryloyl units)

Similarly, when GMA was used to introduce the pendant (meth)acryloyl groups, following formula was used.

Average Molecular weight=(mass of precursor(meth) acrylate copolymer+mass of GMA)÷(moles of(meth)acryloyl units)

Determination of Gel Content

A 1.5 inch by 1.5 inch sample of the adhesive transfer tape (adhesive layer between two release liners/films) was cut out using a square die. One liner was removed and adhered to the center of a pre-weighed rectangular mesh (4 inch by 2.5 inch) and the other liner was removed. The adhesive on the mesh was weighed, while the mesh itself was previously tared. The mesh was McNICHOLS Quality Wire Mesh (square weave, stainless steel type 304, woven construction, 325 mesh, 0.0014 inch wire, 0.0017 inch opening). The overhanging portion of the mesh was folded inwards to cover and immobilize the adhesive inside the mesh. The folded mesh with the adhesive inside was immersed in 30 milliliters of ethyl acetate inside a capped glass jar for 3 days. The mesh with the adhesive was then taken out of the jar and dried in an oven for 30 minutes at 120° C. and weighed again to calculate the sample mass. The percent gel content was calculated using the following equation: (final adhesive weight/initial adhesive weight)×100.

Calculation of Glass Transition Temperature

The Fox equation was used to determine the glass transition temperature (Tg) in degrees Kelvin for the (meth)acrylate copolymer. The calculation is based on the weighted average of the individual homopolymer glass transition values. For a copolymer prepared from n different monomers, the inverse of the Tg of the copolymer is equal to the summation of the weight fraction of each component divided by the Tg of that particular component. That is, for a copolymer prepared from n components, 1/Tg of the copolymer is equal to (weight fraction of component one÷Tg of component one)+(weight fraction of component two÷Tg of component two)+(weight fraction of component 3÷Tg of component 3)+ . . . +(weight fraction of component n÷Tg of component n).

TABLE 1

Materials

| Chemical Name | Supplier Information |
|---|---|
| 2-ethyl hexyl acrylate (2-EHA) | BASF Corporation |
| n-Butyl acrylate (BA) | BASF Corporation |
| n-Butyl methacrylate (BMA) | Rohm and Haas |
| Methyl methacrylate (MMA) | Rohm and Haas |
| 2-hydroxy ethyl acrylate (HEA) | Kowa American Corporation |
| Acrylamide (Acm) | Dianitrix |
| Isocyanato ethyl methacrylate (IEM) | Showa-Denko |
| Pentaerythritol tetrakis(3-mercapto butyrate) (KarenzMT PE1, also referred to as "PE1") | Showa-Denko |
| Ethylene glycol bis(thioglycolate) (EGBTG) | Evans Chemetics |
| Iso-octyl thioglycolate (IOTG) | Evans Chemetics |
| Glycidyl methacrylate (GMA) | Alfa Aesar |
| Hydroquinone monomethyl ether (MeHQ) | Aldrich |
| Ethyl-2,4,6-trimethylbenzoylphenyl-phosphinate photoinitiator (LUCERIN-TPO-L) | BASF Corporation |
| Methyl ethyl ketone (MEK) | Aldrich |
| Isooctyl acrylate (IOA) | Aldrich |
| Acrylic acid (AA) | Aldrich |
| (2,2'-azobis(2-methylbutanenitrile) (VAZO 67) | DuPont |
| (2,2'-azobis(isobutyronitrile) (VAZO 64) | DuPont |
| (2,2'-azobis(2,4-dimethylpentanenitrile) (VAZO 52) | DuPont |
| 1,1'-azobis(cyclohexanecarbonitrile) (VAZO 88) | DuPont |

TABLE 1-continued

| Materials | |
|---|---|
| Chemical Name | Supplier Information |
| 2,5-bis(tert-butylperoxy)-2,5-dimethylhexane (LUPERSOL 101) | Atofina Chemical Inc. |
| 2,5-Dimethyl-2,5-di-(tert-butylperoxy)-3-hexyne (LUPERSOL 130) | Atofina Chemical Inc. |
| Styrene (St) | Aldrich |
| Vinyl Acetate (VA) | Aldrich |
| Pentaerythritoltetrakis(3-(3,5-ditertbutyl-4-hydroxyphenyl)propionate) (IRGANOX 1010) | Ciba |
| Hydrogenated rosin ester (KE-311) | Arakawa Chemical |
| n-Hexyl acrylate (HA) | Aldrich |
| Cyclohexyl acrylate (CHA) | Aldrich |
| Iso-butyl methacrylate (iBMA) | Aldrich |
| Ethyl Acetate | BDH Chemicals |

Example 1

A solution was prepared by stilling 27.72 grams 2-EHA, 45.0 grams BA, 17.0 grams HEA, 5.0 grams Acm, 0.10 gram IRGANOX 1010 antioxidant, 2.25 grams of 11.11 weight percent PE1 (chain-transfer agent) in 2-EHA, and 0.82 gram of 2.44 weight percent MeHQ in 2-EHA within an 8 ounce glass jar and heating to 65° C. The solution was cooled to 50° C. A mixture of 0.48 gram of 0.25 weight percent solids VAZO 52 in 2-EHA was added and mixed. An aliquot of 80 grams of the mixture was transferred to a stainless steel reactor (VSP2 adiabatic reaction apparatus equipped with a 316 stainless steel can that can be obtained from Fauske and Associated Inc., Burr Ridge, Ill.). The reactor was purged of oxygen while heating and pressurized with 60 psi of nitrogen gas before reaching the induction temperature of 63° C. The polymerization reaction proceeded under adiabatic conditions to a peak reaction temperature of 141° C. A 5.0-gram aliquot was taken from the reaction mixture and the unreacted monomer was 59.70 weight percent based on the total weight of the mixture.

A solution was prepared by mixing 1.0 gram VAZO 52 initiator, 0.10 gram VAZO 88 initiator, 0.05 gram LUPERSOL 101 peroxide, 0.15 gram LUPERSOL 130 peroxide, and 48.70 grams ethyl acetate in a 4 ounce glass jar. The mixture was shaken on a reciprocating mixer to dissolve the solids. Then, 0.7 gram of the solution and 0.75 gram of 11.11 weight percent PE1 in 2-EHA was stirred into the stainless steel reactor. The reactor was purged of oxygen while heating and then pressurized with 60 pounds per square inch (psi) of nitrogen gas before reaching the induction temperature of 59° C. The polymerization reaction proceeded under adiabatic conditions to a peak reaction temperature of 193° C. The mixture was isothermally held at that temperature for 30 minutes and then drained into an 8 ounce jar. A sample was taken and the unreacted monomer was 4.32 weight percent based on the total weight of the mixture.

The resulting precursor polymer was dissolved in MEK to 50 percent solids on a reciprocating shaker. Then, 2 parts of IEM per 100 parts of the precursor polymer mass (2 pph) was added and mixed overnight. The next day 1 pph of photoinitiator (LUCERIN-TPO-L) was added to the mixture.

Example 2A

The following components were added to a 5 liter stainless steel reactor: 843.0 grams 2-EHA, 1125.0 grams BA, 375.0 grams HEA, 125.0 grams Acm, 2.50 grams IRGANOX 1010 antioxidant, 7.25 grams EGBTG, and 20.5 grams of 4.76 weight percent MeHQ in 2-EHA. The mixture was heated, while stirring, to 60° C. Then, 12.0 grams of 0.25 weight percent solids VAZO 52 in 2-EHA was added to the reactor and stirred. The reactor was purged of oxygen while heating and pressurized with 6 psi of nitrogen gas before reaching the induction temperature of 63° C. The polymerization reaction proceeded under adiabatic conditions to a peak reaction temperature of 130° C.

A solution was prepared by mixing 1.0 gram VAZO 52, 0.10 gram VAZO 88, 0.05 gram LUPERSOL 101, 0.15 gram LUPERSOL 130, and 48.70 grams ethyl acetate in a 4 ounce glass jar. The mixture was shaken on a reciprocating mixer to dissolve the solids. Then, 17.5 grams of this ethyl acetate solution and 2.42 grams EGBTG were stirred into the reactor. The reactor was purged of oxygen while heating and then pressurized with 6 psi of nitrogen gas before reaching the induction temperature of 59° C. The polymerization reaction proceeded under adiabatic conditions to a peak reaction temperature of 181° C. The reactor was cooled to 135° C. while it was partially vacuum stripped of residual monomers, and then purged with 90/10 nitrogen/oxygen control gas for 30 minutes.

Then, 2.84 grams of IEM were added to the reactor and held at 135° C. under isothermal conditions for 2 hours. Finally, 2.84 grams photoinitiator (LUCERIN-TPO-L) was added into the reactor. The reactor was stirred for 30 minutes and the mixture was drained into 1 pound silicone lined boxes. A sample was taken of the reaction mixture from this step and the unreacted monomer was 6.81 weight percent based on the total weight of the mixture.

Example 2B

A 20 gram sample of the polymer of Example 2A was dissolved in MEK to 50 weight percent solids. An additional amount of LUCERIN-TPO-L was added so that the total amount of LUCERIN-TPO-L added to the precursor polymer was 0.5 pph. No additional IEM was added.

Example 2C

A 20 gram sample of the polymer of Example 2A was dissolved in MEK to 50 weight percent solids. An additional amount of LUCERIN-TPO-L was added so that the total amount of LUCERIN-TPO-L added to the precursor polymer was 0.5 pph. An additional amount of IEM was added so that the total amount of IEM added to the precursor polymer was 0.2 pph.

Example 2D

A 20 gram sample of the polymer of Example 2A was dissolved in MEK to 50 weight percent solids. An additional amount of LUCERIN-TPO-L was added so that the total amount of LUCERIN-TPO-L added to the precursor polymer was 0.5 pph. An additional amount of IEM was added so that the total amount of IEM added to the precursor polymer was 0.8 pph.

Examples 3A and 3B

A solution was prepared by stirring 19.48 grams 2-EHA, 55.0 grams BA, 15.0 grams HEA, 5.0 grams Acm, 0.10 gram IRGANOX 1010 antioxidant, 4.93 grams of 5.88 weight percent EGBTG in 2-EHA, and 0.82 gram of 2.44 weight percent MeHQ in 2-EHA within an 8 ounce glass jar and heating to 65° C. The solution was cooled to 50° C. and 0.48 grams of 0.25 weight percent solids VAZO 52 in 2-EHA was added. Then, 80 grams of the solution was transferred to the stainless steel reactor described in Example 1. The reactor was purged of oxygen while heating and then pressurized with 60 psi of nitrogen gas before reaching the induction temperature of 63° C. The polymerization reaction proceeded under adiabatic conditions to a peak reaction temperature of 130° C. A 5.0-gram aliquot was taken from the reaction mixture and the unreacted monomer was 62.19 weight percent based on the total weight of the mixture.

A solution was prepared by adding 0.25 gram VAZO 52, 0.10 gram VAZO 67, and 49.65 grams ethyl acetate to a 4 ounce glass jar. The mixture was shaken on a reciprocating mixer to dissolve the solids. Then, 0.7 gram of this ethyl acetate solution and 1.64 grams of 5.88 weight percent EGBTG in 2-EHA were stirred into the reactor. The reactor was purged of oxygen while heating and then pressurized with 60 psi of nitrogen gas before reaching the induction temperature of 59° C. The polymerization reaction proceeded under adiabatic conditions to a peak temperature of 153° C. A 1.0-gram aliquot was taken from the reaction mixture and the unreacted monomer was 32.93 weight percent based on the total weight of the mixture.

A solution was prepared by adding 1.0 gram VAZO 67, 0.20 gram VAZO 88, 0.15 gram LUPERSOL 101, 0.15 gram LUPERSOL 130, and 48.50 grams ethyl acetate to a 4 ounce glass jar. The mixture was shaken on a reciprocating mixer until all solids were dissolved, at which point 0.7 gram of the solution was stirred into the reactor. The reactor was purged of oxygen while heating and then pressurized with 60 psi of nitrogen gas before reaching the induction temperature of 80° C. The polymerization reaction proceeded under adiabatic conditions to a peak temperature of 138° C. The reaction mixture was held isothermally at that temperature for 30 minutes before draining the reaction mixture into an 8 ounce jar. A sample was taken of the reaction mixture and the unreacted monomer was 4.29 weight percent based on the total weight of the mixture.

The resulting precursor polymer was dissolved in MEK to 50 weight solids on a reciprocating shaker to prepare a precursor polymer solution.

For Example 3A, a 30 gram aliquot of the precursor polymer solution (15 grams precursor polymer) was mixed overnight with 0.060 grams IEM (this corresponds to 0.4 pph IEM). The next day 0.5 pph of LUCERIN-TPO-L photoinitiator was added to the mixture.

For Example 3B, a 30 gram aliquot of the precursor polymer solution (15 grams of precursor polymer) was mixed overnight with 0.165 grams IEM (this corresponds to 1.1 pph IEM). The next day 0.5 pph of LUCERIN-TPO-L photoinitiator was added to the mixture.

Example 4

The following components were added to a 5 liter stainless steel reaction vessel: 454.7 grams 2-EHA, 1500 grams BA, 375.0 grams HEA, 125.0 grams Acm, 2.50 grams IRGANOX 1010 antioxidant, 15.0 grams IOTG, and 33.8 grams of 1.48 weight percent MeHQ in 2-EHA. The mixture was heated to 60° C. and mechanically stirred until all components were dissolved. Then, 12.0 grams of 0.25 weight percent solids VAZO 52 in 2-EHA was added to the reactor. The reactor was purged of oxygen while heating and then pressurized with 6 psi of nitrogen gas before reaching the induction temperature of 63° C. The polymerization reaction proceeded under adiabatic conditions to a peak reaction temperature of 130° C. An aliquot was taken from the reaction mixture and the unreacted monomer was 68.40 weight percent based on the total weight of the mixture.

A solution was prepared by adding 0.20 gram VAZO 52, 0.07 gram VAZO 67, and 24.73 grams ethyl acetate to a 4 ounce glass jar. The solution was shaken on a reciprocating mixer until all solids were dissolved. Then, 25.0 grams of the solution and 7.50 grams IOTG were stirred into the reactor. The reactor was purged of oxygen while heating and then pressurized with 6 psi of nitrogen gas before reaching the induction temperature of 59° C. The reaction proceeded under adiabatic conditions to a peak reaction temperature of 161° C. An aliquot was taken from the reaction mixture and the unreacted monomer was 24.70 weight percent based on the total weight of the mixture.

A solution was prepared by adding 1.0 gram VAZO 67, 0.25 gram VAZO 88, 0.15 gram LUPERSOL 101, 0.15 gram LUPERSOL 130, and 48.45 grams ethyl acetate to a 4 ounce glass jar. The solution was shaken on a reciprocating mixer until all solids were dissolved. Then, 25.0 grams of the solution was stirred into the reactor at 60° C. The reactor was purged of oxygen while heating and then pressurized with 6 psi of nitrogen gas before reaching the induction temperature of 80° C. The reaction proceeded under adiabatic conditions to a peak temperature of 132° C. The reactor was isothermally held at the peak temperature for 1 hour and then cooled to 130° C. while it was partially vacuum stripped of remaining monomers.

After stripping, the reactor was purged with 90/10 nitrogen/oxygen control gas for 30 minutes. Then, 7.5 grams of IEM dissolved in 20 grams heptane was added to the reactor during a 10 minute period and the reactor was held at 130° C. isothermally for 2 hours. This corresponds to 0.3 pph IEM. Then, 12.50 grams of LUCERIN-TPO-L photoinitiator was added (this corresponds to 0.5 pph LUCERIN-TPO-L) and the final polymer mixture was then drained from the reaction vessel into 1 pound silicone lined boxes. A sample was taken of the reaction mixture from this step and the unreacted monomer was 4.10 weight percent based on the total weight of the mixture.

Example 5A and 5B

A solution prepared by was stirring 32.12 grams 2-EHA, 45.0 grams BA, 16.0 grams HEA, 4.0 grams Acm, 0.10 gram IRGANOX 1010 antioxidant, 1.80 grams of 11.11 weight percent PE1 in 2-EHA, and 0.82 gram of 2.44 weight percent MeHQ in 2-EHA in a 8 ounce glass jar and heating at 65° C. to dissolve the solids. The solution was cooled to 50° C. and 0.48 gram of 0.25 weight percent solids VAZO 52 in 2-EHA was added. Then, 80 grams of the solution was transferred to the stainless steel reactor described in Example 1. The reactor was purged of oxygen while heating and then pressurized with 60 psi of nitrogen gas before reaching the induction temperature of 63° C. The reaction proceeded under adiabatic conditions to a peak temperature of 131° C. A 5.0-gram aliquot was taken from the reaction mixture and the unreacted monomer was 64.68 weight percent based on the total weight of the mixture.

A solution was prepared by mixing 1.0 gram VAZO 52, 0.10 gram VAZO 88, 0.05 gram LUPERSOL 101, 0.15 gram LUPERSOL 130, and 48.70 grams ethyl acetate in a 4 ounce glass jar and shaking on a reciprocating mixer to dissolve the solids. Then, 0.7 gram of the ethyl acetate solution and 0.60 grams of 11.11 weight percent PE1 in 2-EHA were stirred into the reactor. The reactor was purged of oxygen while heating and then pressurized with 60 psi of nitrogen gas before reaching the induction temperature of 59° C. After reaching the induction temperature, the reaction proceeded under adiabatic conditions to a peak reaction temperature of 198° C. The reactor was isothermally held at that temperature for 30 minutes before draining the reaction product into an 8 ounce jar. A sample was taken of the product and the unreacted monomer was 4.25 weight percent based on the total weight of the mixture.

The resulting precursor polymer was dissolved in MEK to 50 weight solids on a reciprocating shaker to prepare a precursor polymer solution.

For Example 5A, a 30 gram aliquot of the precursor polymer solution (15 grams precursor polymer) was mixed overnight with 0.15 grams IEM (this corresponds to 1 pph IEM). The next day, 1 pph of LUCERIN-TPO-L photoinitiator was added to the mixture.

For Example 5B, a 30 gram aliquot of the precursor polymer solution (15 grams precursor polymer) was mixed overnight with 0.075 grams IEM (this corresponds to 0.5 pph IEM). The next day, 0.1 pph of LUCERIN-TPO-L photoinitiator was added to the mixture.

Example 6A, 6B, 6C, and 6D

A solution was prepared by stirring 30.72 grams 2-EHA, 45.0 grams BA, 16.0 grams HEA, 5.0 grams Acm, 0.10 gram IRGANOX 1010 antioxidant, 2.25 grams of 11.11 weight percent PEI in 2-EHA, and 0.82 gram of 2.44 weight percent MeHQ in 2-EHA in an 8 ounce glass jar and heating to 65° C. to dissolve the solids. The solution was then cooled to 50° C., and 0.48 gram of 0.25 weight percent solids VAZO 52 in 2-EHA was stirred into the solution. Then, 80 grams of the solution was transferred to the stainless steel reactor described in Example 1. The reactor was purged of oxygen while heating and then pressurized with 60 psi of nitrogen gas before reaching the induction temperature of 63° C. After reaching the induction temperature, the polymerization reaction proceeded under adiabatic conditions to a peak temperature of 143° C. A 5.0-gram aliquot was taken from the reaction mixture and the unreacted monomer was 59.28 weight percent based on the total weight of the mixture.

A solution was prepared by adding 1.0 gram VAZO 52, 0.10 gram VAZO 88, 0.05 gram LUPERSOL 101, 0.15 gram LUPERSOL 130, and 48.70 grams ethyl acetate to a 4 ounce glass jar. The mixture was shaken on a reciprocating mixer to dissolve the solids. Then, 0.7 gram of this ethyl acetate solution and 0.75 gram of 11.11 weight percent PE1 in 2-EHA were stirred into the reactor. The reactor was purged of oxygen while heating and then pressurized with 60 psi of nitrogen gas before reaching the induction temperature of 59° C. The polymerization reaction proceeded under adiabatic conditions to a peak temperature of 173° C. The reactor was isothermally held at that temperature for 30 minutes and then the produce was drained into an 8 ounce jar. A sample was taken of the reaction mixture and the unreacted monomer was 8.97 weight percent based on the total weight of the mixture.

The resulting precursor polymer was dissolved in MEK to 50 weight solids on a reciprocating shaker to prepare a precursor polymer solution.

For Example 6A, a 30 gram aliquot of the precursor polymer solution (15 grams precursor polymer) was mixed overnight with 0.15 grams IEM (this corresponds to 1 pph IEM). On the next day, 1 pph of LUCERIN-TPO-L photoinitiator was added to the mixture.

For Example 6B, a 30 gram aliquot of the precursor polymer solution (15 grams precursor polymer) was mixed overnight with 0.075 grams IEM (this corresponds to 0.5 pph IEM). On the next day, 1 pph of LUCERIN-TPO-L photoinitiator was added to the mixture.

For Example 6C, a 30 gram aliquot of the precursor polymer solution (15 grams precursor polymer) was mixed overnight with 0.015 grams IEM (this corresponds to 0.1 pph IEM). On the next day, 0.5 pph of LUCERIN-TPO-L photoinitiator was added to the mixture.

For Example 6D, a 30 gram aliquot of the precursor polymer solution (15 grams precursor polymer) was mixed overnight with 0.038 grams IEM (this corresponds to 0.25 pph IEM). On the next day, 0.5 pph of LUCERIN-TPO-L photoinitiator was added to the mixture.

Example 7

A solution was prepared by stirring 22.68 grams 2-EHA, 50.0 grams BMA, 15.0 grams HEA, 5.0 grams Acm, 0.10 gram IRGANOX 1010 antioxidant, 5.44 grams of 5.88 weight percent EGBTG in 2-EHA, and 0.42 gram of 4.76 weight percent MeHQ in 2-EHA in an 8 ounce glass jar and heating to 65° C. to dissolve the solids. The solution was then cooled to 50° C. and 1.81 grams of 0.50 weight percent solids VAZO 52 in 2-EHA were stirred into the solution. Then, 80 grams of the solution was transferred to a stainless steel reactor described in Example 1. The reactor was purged of oxygen while heating and then pressurized with 60 psi of nitrogen gas before reaching the induction temperature of 61° C. The reaction proceeded under adiabatic conditions to a peak temperature of 112° C. A 5.0-gram aliquot was taken from the reaction mixture and the unreacted monomer was 64.10 weight percent based on the total weight of the mixture.

A solution was prepared by adding 0.25 gram VAZO 52, 0.10 gram VAZO 67, and 49.65 grams ethyl acetate to a 4 ounce glass jar. The mixture was shaken on a reciprocating mixer to dissolve the solids. Then, 0.7 gram of this ethyl acetate solution and 1.81 grams of 5.88 weight percent EGBTG in 2-EHA were stirred into the reactor. The reactor was purged of oxygen while heating and then pressurized with 60 psi of nitrogen gas before reaching the induction temperature of 59° C. The polymerization reaction proceeded under adiabatic conditions to a peak temperature of 108° C. A 1.0-gram aliquot was taken from the reaction mixture and the unreacted monomer was 31.61 weight percent based on the total weight of the mixture.

A solution was prepared by adding 1.0 gram VAZO 67, 0.20 gram VAZO 88, 0.15 gram LUPERSOL 101, 0.15 gram LUPERSOL 130, and 48.50 grams ethyl acetate to a 4 ounce glass jar and shaking on a reciprocating mixer to dissolve the solids. Then, 0.7 gram of the ethyl acetate solution was stirred into the reactor. The reactor was purged of oxygen while heating and then pressurized with 60 psi of nitrogen gas before reaching the induction temperature of 80° C. The reaction proceeded under adiabatic conditions to a peak temperature of 117° C. The reactor was isothermally held at that temperature for 60 minutes before draining product into an 8 ounce jar. A sample was taken of the reaction mixture and the unreacted monomer was 18.07 weight percent based on the total weight of the mixture.

The polymer was dissolved in MEK to 50 weight percent solids on a reciprocating shaker. Then, 0.2 pph IEM was added and the resulting mixture was mixed overnight. The next day, 0.72 pph LUCERIN-TPO-L photoinitiator was added to the mixture.

Example 8

A solution was prepared by stirring 47.68 grams 2-EHA, 25.0 grams methyl methacrylate (MMA), 15.0 grams HEA, 5.0 grams Acm, 0.10 gram IRGANOX 1010 antioxidant, 5.44 grams of 5.88 weight percent EGBTG in 2-EHA, and 0.82 gram of 2.44 weight percent MeHQ in 2-EHA within an 8 ounce glass jar and heating to 65° C. to dissolve the solids. The solution was then cooled to 50° C. and 1.81 grams of 0.50 weight percent solids VAZO 52 in 2-EHA was stirred into solution. Then, 80 grams of the solution was transferred to the stainless steel reactor described in Example 1. The reactor was purged of oxygen while heating and then pressurized with 60 psi of nitrogen gas before reaching the induction temperature of 61° C. The polymerization reaction proceeded under adiabatic conditions to a peak temperature of 123° C. The reactor was then allowed to cool to less than 80° C. before depressurizing. A 5.0 grams aliquot was taken from the reaction mixture and the unreacted monomer was 66.25 weight percent based on the total weight of the mixture.

A solution was prepared by mixing 0.25 gram VAZO 52, 0.10 gram VAZO 67, and 24.65 grams ethyl acetate in a 4 ounce glass jar and shaking on a reciprocating mixer to dissolve the solids. Then, 0.7 gram of this ethyl acetate solution and 1.53 grams of 5.88 weight percent EGBTG in 2-EHA were stirred into the reactor. The reactor was purged of oxygen while heating and then pressurized with 60 psi of nitrogen gas before reaching the induction temperature of 59° C. The polymerization reaction proceeded under adiabatic conditions to a peak temperature of 156° C. A 1.0-gram aliquot was taken from the reaction mixture and the unreacted monomer was 20.04 weight percent based on the total weight of the mixture.

A solution was prepared by mixing 1.0 gram VAZO 67, 0.20 gram VAZO 88, 0.15 gram LUPERSOL 101, 0.15 gram LUPERSOL 130, and 48.50 grams ethyl acetate in a 4 ounce glass jar and shaking on a reciprocating mixer to dissolve the solids. Then, 0.7 gram of this ethyl acetate solution was stirred into the reactor. The reactor was purged of oxygen while heating and then pressurized with 60 psi of nitrogen gas before reaching the induction temperature of 80° C. The reaction proceeded under adiabatic conditions to a peak temperature of 117° C. and then the reactor was isothermally held for 60 minutes before draining the product into an 8 ounce jar. A sample taken from the reaction mixture and the unreacted monomer was 5.85 weight percent based on the total weight of the mixture.

The polymer was dissolved in MEK to 50 weight percent solids in a reciprocating shaker. Then, 0.24 pph IEM was added and the mixture was mixed overnight. The next day, 0.84 pph LUCERIN-TPO-L photoinitiator was added to the mixture.

Example 9

A solution was prepared by mixing 86.64 grams isooctyl acrylate (IOA), 10.00 grams acrylic acid, 0.1 gram IRGANOX 1010 antioxidant, 1.70 grams of 5.88 weight percent IOTG (chain-transfer agent) in IOA, and 0.82 gram of 2.44 weight percent MeHQ in 2-EHA. Then, 0.96 gram of 0.25 weight percent solids VAZO 52 in IOA was added to the solution. Then, 80 grams of the solution was transferred to the stainless steel reactor described in Example 1. The reactor was purged of oxygen while heating and then pressurized with 60 psi of nitrogen gas before reaching the induction temperature of 61° C. The polymerization reaction proceeded under adiabatic conditions to a peak temperature of 145° C. A 5.0-gram aliquot was taken from the reaction mixture and the unreacted monomer was 49.67 weight percent based on the total weight of the mixture.

A solution was prepared by mixing 2.50 grams IOTG, 1.0 gram VAZO 52, 0.10 gram VAZO 88, 0.05 gram LUPERSOL 101, 0.15 gram LUPERSOL 130, and 46.20 grams ethyl acetate in a 4 ounce glass jar and shaking on a reciprocating mixer to dissolve the solids. Then, 0.7 gram of this ethyl acetate solution was stirred into the reactor. The reactor was purged of oxygen while heating and then pressurized with 60 psi of nitrogen gas before reaching the induction temperature of 59° C. The polymerization reaction proceeded under adiabatic conditions to a peak temperature of 140° C. and then the reactor was isothermally held at that temperature for 60 minutes before draining the product into an 8 ounce jar. A sample was taken of the reaction mixture and the unreacted monomer was 7.86 weight percent based on the total weight of the mixture.

The polymer was dissolved in MEK to 50 weight percent solids in a reciprocating shaker. Then, 0.2 pph GMA was added and the solution was mixed in a stirred water bath at 65° C. for at least 2 hours. The solution was then stored at ambient temperature. The next day 0.65 pph LUCERIN-TPO-L photoinitiator was added to the mixture.

Example 10

A solution was prepared by stirring 45.80 grams BA, 30.0 grams St, 15.0 grams HEA, 5.0 grams Acm, 0.10 gram IRGANOX 1010 antioxidant, 3.00 grams of 20.0 weight percent IOTG in BA, and 0.82 gram of 2.44 weight percent MeHQ in BA within an 8 ounce glass jar and heating to 65° C. The solution was cooled to 50° C. and 4.10 grams of 0.99 weight percent solids VAZO 52 in BA was added. Then, 80 grams of the solution was transferred to the stainless steel reactor described in Example 1. The reactor was purged of oxygen while heating and then pressurized with 60 psi of nitrogen gas before reaching the induction temperature of 61° C. The polymerization reaction proceeded under adiabatic conditions to a peak reaction temperature of 132° C. A 5.0-gram aliquot was taken from the reaction mixture and the unreacted monomer was 54.82 weight percent based on the total weight of the mixture.

A solution was prepared by adding 0.20 gram VAZO 52, 0.075 gram VAZO 67, and 4.73 grams ethyl acetate to a 4 ounce glass jar. The mixture was shaken on a reciprocating mixer to dissolve the solids. Then, 0.7 gram of this ethyl acetate solution and 1.00 grams of 20.0 weight percent IOTG in BA were stirred into the reactor. The reactor was purged of oxygen while heating and then pressurized with 60 psi of nitrogen gas before reaching the induction temperature of 59° C. The polymerization reaction proceeded under adiabatic conditions to a peak temperature of 167° C. A 1.0-gram aliquot was taken from the reaction mixture and the unreacted monomer was 13.23 weight percent based on the total weight of the mixture.

A solution was prepared by adding 1.0 gram VAZO 67, 0.20 gram VAZO 88, and 0.15 gram LUPERSOL 101, and 23.65 grams ethyl acetate to a 4 ounce glass jar. The mixture was shaken on a reciprocating mixer until all solids were dissolved, at which point 0.7 gram of the solution was stirred into the reactor. The reactor was purged of oxygen while heating and then pressurized with 60 psi of nitrogen gas before reaching the induction temperature of 100° C. The polymerization reaction proceeded under adiabatic conditions to a peak temperature of 135° C. The reaction mixture was held isothermally at that temperature for 30 minutes before draining the reaction mixture into an 8 ounce jar. A sample was taken of the reaction mixture and the unreacted monomer was 3.70 weight based on the total weight of the mixture.

The polymer was dissolved in MEK to 50 weight percent solids in a reciprocating shaker. Then, 0.3 pph IEM was added and the mixture was mixed overnight. The next day, 0.5 pph LUCERIN-TPO-L photoinitiator was added to the mixture.

Example 11

The following components were added to a 5 liter stainless steel reaction vessel: 454.7 grams 2-EHA, 1375 grams BA, 375.0 grams HEA, 125.0 grams Acm, 125.0 grams VA, 2.50 grams IRGANOX 1010 antioxidant, 15.0 grams IOTG, and 33.8 grams of 1.48 weight percent MeHQ in 2-EHA. The mixture was heated to 60° C. and mechanically stirred until all components were dissolved. Then, 12.0 grams of 0.25 weight percent solids VAZO 52 in 2-EHA was added to the reactor. The reactor was purged of oxygen while heating and then pressurized with 6 psi of nitrogen gas before reaching the induction temperature of 61° C. The polymerization reaction proceeded under adiabatic conditions to a peak reaction temperature of 132° C. An aliquot was taken from the reaction mixture and the unreacted monomer was 61.10 weight percent based on the total weight of the mixture.

A solution was prepared by adding 0.20 gram VAZO 52, 0.07 gram VAZO 67, and 49.73 grams ethyl acetate to a 4 ounce glass jar. The solution was shaken on a reciprocating mixer until all solids were dissolved. Then, 25.0 grams of the solution and 5.00 grams IOTG were stirred into the reactor. The reactor was purged of oxygen while heating and then pressurized with 6 psi of nitrogen gas before reaching the induction temperature of 63° C. The reaction proceeded under adiabatic conditions to a peak reaction temperature of 152° C. An aliquot was taken from the reaction mixture and the unreacted monomer was 28.77 weight percent based on the total weight of the mixture.

A solution was prepared by adding 1.0 gram VAZO 67, 0.25 gram VAZO 88, 0.15 gram LUPERSOL 101, 0.15 gram LUPERSOL 130, and 48.45 grams ethyl acetate to a 4 ounce glass jar. The solution was shaken on a reciprocating mixer until all solids were dissolved. Then, 25.0 grams of the solution and 5.00 gram IOTG was stirred into the reactor at 70° C. The reactor was purged of oxygen while heating and then pressurized with 6 psi of nitrogen gas before reaching the induction temperature of 80° C. The reaction proceeded under adiabatic conditions to a peak temperature of 135° C. The reactor was isothermally held at the peak temperature for 1 hour. The reactor was then heated to 160° C. and partially vacuum stripped of residual monomer for 2 hours before being cooled to 130° C. An aliquot was taken from the reaction mixture and the unreacted monomer was 1.68 weight percent based on the total weight of the mixture.

After stripping, the reactor was purged with 90/10 nitrogen/oxygen control gas for 30 minutes. Then, 6.5 grams of IEM (this corresponds to 0.26 pph IEM) dissolved in 20 grams heptane was added to the reactor under static vacuum over a 10 minute period and the reactor was held at 130° C. isothermally for 40 minutes. Then, 12.50 grams of LUCERIN TPO-L photoinitiator (this corresponds to 0.5 pph LUCERIN TPO-L) was added and the final polymer mixture stirred for 30 minutes and then drained from the reaction vessel into a 5 pound silicone lined box. A sample was taken of the reaction mixture from this step and the unreacted monomer was 1.65 weight percent based on the total weight of the mixture. The residuals were less than 2 weight percent based on a total weight of the (meth)acrylate copolymer.

Example 12

The following components were added to a 1 liter amber jar: 120.0 grams HA, 40.0 grams BA, 30.0 grams HEA, 10.0 grams Acm, 298.0 grams ethyl acetate, 1.2 gram IOTG, and 2.0 gram of 10.0 weight percent VAZO 67 in ethyl acetate. The bottle was purged with 1.5 L/min nitrogen gas for a minimum of 120 seconds to remove any residual oxygen before being capped and sealed. The sealed bottle was then mounted into a laundrometer water bath and heated to 60° C. and mechanically rotated during reaction. The reaction was allowed to proceed for 18-24 hours before being removed from the laundrometer and allowed to cool to room temperature.

After cooling, 0.3 pph of IEM was added to the bottle and mixed overnight on a reciprocating shaker. The next day 1 pph of LUCERIN-TPO-L photoinitiator was added to the mixture and returned to the reciprocating shaker for at least 15-20 minutes.

After compounding two 100 gram aliquots of the final polymer mixture were transferred into 4 ounce amber jars and mixed with 4 grams and 12 grams or KE311 tackifier respectively on a reciprocating shaker overnight.

Example 13

The following components were added to a 1 liter amber jar: 140.0 grams BMA, 20.0 grams BA, 30.0 grams HEA, 10.0 grams Acm, 298.0 grams ethyl acetate, 1.2 gram IOTG, and 2.0 gram of 10.0 weight percent VAZO 67 in ethyl acetate. The bottle was purged with 1.5 L/min nitrogen gas for a minimum of 120 seconds to remove any residual oxygen before being capped and sealed. The sealed bottle was then mounted into a laundrometer water bath and heated to 60° C. and mechanically rotated during reaction. The reaction was allowed to proceed for 18-24 hours before being removed from the laundrometer and allowed to cool to room temperature.

After cooling, 0.3 pph of IEM was added to the bottle and mixed overnight on a reciprocating shaker. The next day 1 pph of LUCERIN-TPO-L photoinitiator was added to the mixture and returned to the reciprocating shaker for at least 15-20 minutes.

After compounding two 100 gram aliquots of the final polymer mixture were transferred into 4 ounce amber jars and mixed with 4 grams and 12 grams or KE311 tackifier respectively on a reciprocating shaker overnight.

Example 14A and 14B

The following components were added to a 1 liter amber jar: 80.0 grams BMA, 80.0 grams BA, 30.0 grams HEA, 10.0 grams Acm, 298.0 grams ethyl acetate, 1.6 grams IOTG, and 2.0 grams of 10.0 weight percent VAZO 67 in ethyl acetate. The bottle was purged with 1.5 L/min nitrogen gas for a minimum of 120 seconds to remove any residual oxygen before being capped and sealed. The sealed bottle was then mounted into a laundrometer water bath and heated to 60° C. and mechanically rotated during reaction. The reaction was allowed to proceed for 18-24 hours before being removed from the laundrometer and allowed to cool to room temperature.

For Example 14A, a 100 gram aliquot of the final precursor polymer solution (this corresponds to 40 grams of precursor polymer) was place in an 8 ounce amber jar. This solution was mixed overnight with 0.22 grams IEM (this corresponds to 0.55 pph IEM). On the next day, 1 pph of LUCERIN-TPO-L photoinitiator was added and the mixture was returned to the reciprocating shaker for at least 15-20 minutes.

For Example 14B, a 100 gram aliquot of the final precursor polymer solution (this corresponds to 40 grams of precursor polymer) was place in an 8 ounce amber jar. This solution was mixed overnight with 0.60 grams IEM (this corresponds to 1.5 pph IEM). On the next day, 1 pph of LUCERIN-TPO-L photoinitiator was added and the mixture was returned to the reciprocating shaker for at least 15-20 minutes.

Example 15A and 15B

The precursor polymer was prepared like that for Examples 14A and 14B except that 1.2 gram IOTG was used to produce a precursor polymer of higher molecular weight.

For Example 15A, a 100 gram aliquot of the final precursor polymer solution (this corresponds to 40 grams of precursor polymer) was place in an 8 ounce amber jar. This solution was mixed overnight with 0.14 grams IEM (this corresponds to 0.35 pph IEM). The next day, 1 pph of LUCERIN-TPO-L photoinitiator was added to the mixture and returned to the reciprocating shaker for at least 15-20 minutes.

For Example 15B, a 100 gram aliquot of the final precursor polymer solution (this corresponds to 40 grams of precursor polymer) was place in an 8 ounce amber jar. This solution was mixed overnight with 0.36 grams IEM (this corresponds to 0.9 pph IEM). The next day, 1 pph of LUCERIN-TPO-L photoinitiator was added to the mixture and returned to the reciprocating shaker for at least 15-20 minutes.

Example 16A and 16B

The precursor polymer was prepared like that for Examples 14A and 14B except that 1.0 gram IOTG was used to produce a precursor polymer of higher molecular weight.

For Example 16A, a 100 gram aliquot of the final precursor polymer solution (this corresponds to 40 grams of precursor polymer) was place in an 8 ounce amber jar. This solution was mixed overnight with 0.10 grams IEM (this corresponds to 0.25 pph IEM). The next day, 1 pph of LUCERIN-TPO-L photoinitiator was added to the mixture and returned to the reciprocating shaker for at least 15-20 minutes.

For Example 16B, a 100 gram aliquot of the final precursor polymer solution (this corresponds to 40 grams of precursor polymer) was place in an 8 ounce amber jar. This solution was mixed overnight with 0.24 grams IEM (this corresponds to 0.60 pph IEM). The next day, 1 pph of LUCERIN-TPO-L photoinitiator was added to the mixture and returned to the reciprocating shaker for at least 15-20 minutes.

Example 17A and 17B

The precursor polymer was prepared like that for Examples 14A and 14B except that 0.8 gram IOTG was used to produce a precursor polymer of higher molecular weight.

For Example 17A, a 100 gram aliquot of the final precursor polymer solution (this corresponds to 40 grams of precursor polymer) was place in an 8 ounce amber jar. This solution was mixed overnight with 0.08 grams IEM (this corresponds to 0.2 pph IEM). The next day, 1 pph of LUCERIN-TPO-L photoinitiator was added to the mixture and returned to the reciprocating shaker for at least 15-20 minutes.

For Example 17B, a 100 gram aliquot of the final precursor polymer solution (this corresponds to 40 grams of precursor polymer) was place in an 8 ounce amber jar. This solution was mixed overnight with 0.18 grams IEM (this corresponds to 0.45 pph IEM). The next day, 1 pph of LUCERIN-TPO-L photoinitiator was added to the mixture and returned to the reciprocating shaker for at least 15-20 minutes.

Example 18A and 18B

The precursor polymer was prepared like that for Examples 14A and 14B except that 0.6 gram IOTG was used to produce a precursor polymer of higher molecular weight.

For Example 18A, a 100 gram aliquot of the final precursor polymer solution (this corresponds to 40 grams of precursor polymer) was place in an 8 ounce amber jar. This solution was mixed overnight with 0.48 grams IEM (this corresponds to 1.2 pph IEM). The next day, 1 pph of LUCERIN-TPO-L photoinitiator was added to the mixture and returned to the reciprocating shaker for at least 15-20 minutes.

For Example 18B, a 100 gram aliquot of the final precursor polymer solution (this corresponds to 40 grams of precursor polymer) was place in an 8 ounce amber jar. This solution was mixed overnight with 0.12 grams IEM (this corresponds to 0.3 pph IEM). The next day, 1 pph of LUCERIN-TPO-L photoinitiator was added to the mixture and returned to the reciprocating shaker for at least 15-20 minutes.

Example 19A and 19B

The precursor polymer was prepared like that for Examples 14A and 14B except that 0.4 gram IOTG was used to produce a precursor polymer of higher molecular weight.

For Example 19A, a 100 gram aliquot of the final precursor polymer solution (this corresponds to 40 grams of precursor polymer) was place in an 8 ounce amber jar. This solution was mixed overnight with 0.32 grams IEM (this corresponds to 0.8 pph IEM). The next day, 1 pph of LUCERIN-TPO-L photoinitiator was added to the mixture and returned to the reciprocating shaker for at least 15-20 minutes.

For Example 19B, a 100 gram aliquot of the final precursor polymer solution (this corresponds to 40 grams of precursor polymer) was place in an 8 ounce amber jar. This solution was mixed overnight with 0.80 grams IEM (this corresponds to 2 pph IEM). On the next day, 1 pph of LUCERIN-TPO-L photoinitiator was added and the mixture was returned to the reciprocating shaker for at least 15-20 minutes.

Example 20

The following components were added to a 1 liter amber jar: 120.0 grams BMA, 40.0 grams BA, 30.0 grams HEA, 10.0 grams Acm, 298.0 grams ethyl acetate, 1.2 gram IOTG, and 2.0 gram of 10.0 weight percent VAZO 67 in ethyl acetate. The bottle was purged with 1.5 L/min nitrogen gas for a minimum of 120 seconds to remove any residual oxygen before being capped and sealed. The sealed bottle was then mounted into a laundrometer water bath and heated to 60° C. and mechanically rotated during reaction. The reaction was allowed to proceed for 18-24 hours before being removed from the laundrometer and allowed to cool to room temperature.

After cooling, 0.3 pph of IEM was added to the bottle and mixed overnight on a reciprocating shaker. On next day, 1 pph of LUCERIN-TPO-L photoinitiator was added and the mixture was returned to the reciprocating shaker for at least 15-20 minutes.

Example 21

The sample was prepared identical to Example 20 except that 120.0 grams CHA was used in place of the 120.0 grams BMA.

Example 22

The sample was prepared identical to Example 20 except that 120.0 grams iBMA was used in place of the 120.0 grams BMA.

Example 23

The sample was prepared identical to Example 20 except that 160.0 grams BA was used in place of the 120.0 grams BMA and 40.0 grams BA.

Summary of Compositions of (Meth)acrylate Copolymers Prepared

For all the preceding examples, the compositions for the precursor polymers (polymeric material prior to addition of the pendant (meth)acryloyl groups) are shown in Table 2 in weight percent and the monomers (BA, BMA, MMA, 2-EHA, HEA, Acm, IOA, AA, St, HA, VA, CHA, and iBMA) add up to 100 parts. The amounts of other additives, e.g., chain transfer agents, etc., are in parts per hundred (pph) based on the weight of the precursor polymer. The amounts of the monomer reacted with the precursor polymer to form the pendant (meth)acryloyl groups are based on parts per hundred of the precursor polymer. The amount of IOTG represents only the initial amount of chain transfer agent added. In some cases, additional amounts were added during the reaction.

Table 3 also shows weight average molecular weight, the average number of (meth)acryloyl groups per polymer chain, the theoretical average molecular weight between (meth)acryloyl groups. This table also indicates the methods used to add the (meth)acryloyl groups to the precursor polymer. In method 1, the precursor polymers were dissolved in MEK. The monomer reacted with the precursor polymer to add pendant (meth)acryloyl groups (IEM or GMA) was added to the precursor polymer solution. In method 2, the monomer was added to the reactor immediately after preparation of the precursor polymer. In method 3, a portion of the monomer was added to the reactor immediately after preparation of the precursor polymer (as in method 2) and then another portion of the monomer was added to solution of the precursor polymer in MEK (as in method 1).

Comparative Examples C1-C6

Comparative Example C1 corresponds to Example 1 in U.S. Patent Application Publication 2012/0115976 (Igarashi et al.).

Comparative Example C2 corresponds to Example 2 in U.S. Patent Application Publication 2012/0115976 (Igarashi et al.).

Comparative Example C3 corresponds to Example 4 in U.S. Patent Application Publication 2012/0115976 (Igarashi et al.).

Comparative Example C4 corresponds to Example 6 in U.S. Patent Application Publication 2012/0115976 (Igarashi et al.).

Comparative Example C5 corresponds to Example 7 in Patent Application Publication WO 2011/112508 (Suwa et al.).

Comparative Example C6 corresponds to Example 11 in Patent Application Publication WO 2011/112508 (Suwa et al.).

TABLE 2

Composition of Examples 1-23

| Ex # | Fox Tg (° C.) | BA (wt %) | HA (wt %) | BMA (wt %) | iBMA (wt %) | CHA (wt %) | St (wt %) | MMA (wt %) | 2-EHA (wt %) | HEA (wt %) | Acm (wt %) | VA (wt %) | IOA (wt %) | AA (wt %) | PE1 (pph) | EGBTG (pph) | IOTG (pph) |
|---|---|---|---|---|---|---|---|---|---|---|---|---|---|---|---|---|---|
| Ex1 | −45.7 | 45 | | | | | | | 33 | 17 | 5 | | | | 0.25 | | |
| Ex2 | −46.6 | 45 | | | | | | | 35 | 15 | 5 | | | | | 0.29 | |
| Ex3 | −45.6 | 55 | | | | | | | 25 | 15 | 5 | | | | | 0.29 | |
| Ex4 | −45.1 | 60 | | | | | | | 20 | 15 | 5 | | | | | | 0.60 |
| Ex5 | −47.4 | 45 | | | | | | | 35 | 16 | 4 | | | | 0.20 | | |
| Ex6 | −46.1 | 45 | | | | | | | 34 | 16 | 5 | | | | 0.25 | | |
| Ex7 | −11.9 | | | 50 | | | | | 30 | 15 | 5 | | | | | 0.32 | |
| Ex8 | −21.5 | | | | | | | 25 | 55 | 15 | 5 | | | | | 0.27 | |
| Ex9 | −55.2 | | | | | | | | | | | | 90 | 10 | | | 0.10 |
| Ex10 | −8.7 | 50 | | | | | 30 | | | 15 | 5 | | | | | | 0.60 |
| Ex11 | −41.8 | 55 | | | | | | | 20 | 15 | 5 | 5 | | | | | 0.60 |
| Ex12 | −37.2 | 20 | 60 | | | | | | | 15 | 5 | | | | | | 0.60 |
| Ex13 | 9.4 | 10 | 70 | | | | | | | 15 | 5 | | | | | | 0.60 |
| Ex14 | −15.7 | 40 | 40 | | | | | | | 15 | 5 | | | | | | 0.80 |
| Ex15 | −15.7 | 40 | 40 | | | | | | | 15 | 5 | | | | | | 0.60 |
| Ex16 | −15.7 | 40 | 40 | | | | | | | 15 | 5 | | | | | | 0.50 |
| Ex17 | −15.7 | 40 | 40 | | | | | | | 15 | 5 | | | | | | 0.40 |
| Ex18 | −15.7 | 40 | 40 | | | | | | | 15 | 5 | | | | | | 0.30 |
| Ex19 | −15.7 | 40 | 40 | | | | | | | 15 | 5 | | | | | | 0.20 |
| Ex20 | 0.5 | 20 | | 60 | | | | | | 15 | 5 | | | | | | 0.60 |
| Ex21 | 0.0 | 20 | | | | 60 | | | | 15 | 5 | | | | | | 0.60 |
| Ex22 | 16.9 | 20 | | | 60 | | | | | 15 | 5 | | | | | | 0.60 |
| Ex23 | −43.0 | 80 | | | | | | | | 15 | 5 | | | | | | 0.60 |

TABLE 3

Weight Average Molecular Weight and Theoretical Average Molecular weight between (Meth)acryloyl Groups

| Ex. # | Precursor Polymer (grams) | IEM or GMA (grams) | Mw (kDa) | Polydispersity Index | (Meth)acryloyl per Chain | TPO-L (pph) | Average Molecular weight between (Meth)acryloyl groups (kDa) | (Meth)acryloyl Addition Method |
|---|---|---|---|---|---|---|---|---|
| 1 | 60 | 1.2 | 262 | 36.67 | 33.8 | 1 | 7.9 | IEM-1 |
| 2A | 2500 | 2.84 | 174 | 6.03 | 1.3 | 0.11 | 136.7 | IEM-2 |
| 2B | 20 | 0.023 | 174 | 6.03 | 1.3 | 0.5 | 136.7 | IEM-3 |
| 2C | 20 | 0.039 | 174 | 6.03 | 2.2 | 0.5 | 79.1 | IEM-3 |
| 2D | 20 | 0.16 | 174 | 6.03 | 8.9 | 0.5 | 19.6 | IEM-3 |
| 3A | 15 | 0.060 | 197 | 5.67 | 5.1 | 0.5 | 38.9 | IEM-1 |
| 3B | 15 | 0.165 | 197 | 5.67 | 14.0 | 0.5 | 14.3 | IEM-1 |
| 4 | 2500 | 7.5 | 140 | 5.64 | 2.7 | 0.5 | 51.9 | IEM-2 |
| 5A | 15 | 0.15 | 330 | 22.05 | 21.3 | 1 | 15.7 | IEM-1 |
| 5B | 15 | 0.075 | 330 | 22.05 | 10.6 | 0.1 | 31.2 | IEM-1 |
| 6A | 15 | 0.15 | 282 | 6.99 | 18.2 | 1 | 15.7 | IEM-1 |
| 6B | 15 | 0.075 | 282 | 6.99 | 9.1 | 1 | 31.2 | IEM-1 |
| 6C | 15 | 0.015 | 282 | 6.99 | 1.8 | 0.5 | 155.3 | IEM-1 |
| 6D | 15 | 0.038 | 282 | 6.99 | 4.5 | 0.5 | 62.2 | IEM-1 |
| 7 | 10 | 0.020 | 171 | 4.45 | 2.2 | 0.72 | 77.7 | IEM-1 |
| 8 | 13 | 0.031 | 224 | 5.79 | 3.4 | 0.84 | 65.2 | IEM-1 |
| 9 | 43 | 0.085 | 219 | 5.19 | 3.1 | 0.65 | 71.6 | GMA-1 |
| 10 | 60 | 0.18 | 210 | 10.09 | 15.4 | 0.5 | 13.8 | IEM-1 |
| 11 | 2500 | 6.5 | 173 | 7.54 | 2.9 | 0.5 | 59.8 | IEM-2 |
| 12 | 200 | 0.60 | 147 | 2.61 | 2.8 | 1 | 51.9 | IEM-1 |
| 13 | 200 | 0.60 | 87 | 2.05 | 1.7 | 1 | 51.9 | IEM-1 |
| 14A | 40 | 0.22 | 60 | 2.00 | 2.1 | 1 | 28.4 | IEM-1 |
| 14B | 40 | 0.60 | 60 | 2.00 | 5.8 | 1 | 10.5 | IEM-1 |
| 15A | 40 | 0.14 | 96 | 1.95 | 2.2 | 1 | 44.5 | IEM-1 |
| 15B | 40 | 0.36 | 96 | 1.95 | 5.6 | 1 | 17.4 | IEM-1 |
| 16A | 40 | 0.10 | 130 | 2.03 | 2.1 | 1 | 62.2 | IEM-1 |
| 16B | 40 | 0.24 | 130 | 2.03 | 5.0 | 1 | 26.0 | IEM-1 |
| 17A | 40 | 0.08 | 178 | 2.09 | 2.3 | 1 | 77.7 | IEM-1 |
| 17B | 40 | 0.18 | 178 | 2.09 | 5.2 | 1 | 34.6 | IEM-1 |
| 18A | 40 | 0.48 | 274 | 2.16 | 21.2 | 1 | 13.1 | IEM-1 |
| 18B | 40 | 0.12 | 274 | 2.16 | 5.3 | 1 | 51.9 | IEM-1 |
| 19A | 40 | 0.32 | 411 | 2.08 | 21.2 | 1 | 19.5 | IEM-1 |
| 19B | 40 | 0.80 | 411 | 2.08 | 53.0 | 1 | 7.9 | IEM-1 |
| 20 | 200 | 0.60 | 87 | 2.20 | 1.7 | 1 | 51.9 | IEM-1 |
| 21 | 200 | 0.60 | 89 | 2.08 | 1.7 | 1 | 51.9 | IEM-1 |
| 22 | 200 | 0.60 | 138 | 2.79 | 2.7 | 1 | 51.9 | IEM-1 |
| 23 | 200 | 0.60 | 147 | 2.73 | 2.8 | 1 | 51.9 | IEM-1 |
| C1 | 40 | 14.6 | 2 | | 4.7 | 2.0 | 0.6 | |
| C2 | 40 | 2.65 | 11 | | 4.7 | 1.6 | 2.5 | |
| C3 | 40 | 10.9 | 2 | | 3.5 | 1.9 | 0.7 | |
| C4 | 40 | 1.08 | 11 | | 1.9 | 1.5 | 5.9 | |
| C5 | 40 | 0.44 | 2 | | 0.1 | 1.5 | 14.3 | |
| C6 | 100 | 4.5 | 160 | | 46.4 | 0.5 | 3.6 | |

Articles

Articles were prepared with the adhesive compositions from the examples shown in Table 5. Coatings were prepared by dissolving the adhesives in 50 weight percent MEK and knife coating the compositions onto clear silicone release coated polyester films. The compositions were knife coated onto the films with a coating gap of 6 mils. The coated films were dried in an oven set at 70° C. for 20 minutes and then allowed to cool to room temperature. Two coated adhesive films were laminated with the adhesive sides together to double the adhesive coating thickness to about 4 mils. The adhesive films were exposed to UV black lights from both sides at the doses shown in Table 4, which also shows the gel content of the adhesives.

The UV dose was measured using an EIT UV Power Puck II (available from EIT, Sterling, Va.) in the 350 nm range.

TABLE 4

Gel content

| UV Dose (mJ/cm$^2$) | Ex2A | Ex2B | Ex2C | Ex3A | Ex3B | Ex5A | Ex5B | Ex6A | Ex6B | Ex6C | Ex6D |
|---|---|---|---|---|---|---|---|---|---|---|---|
| 0 | 0.0 | | | | | 1.3 | | 0.4 | 0.4 | | |
| 50 | 0.0 | | 0.7 | 0.8 | 28.1 | 59.4 | 1.8 | 40.1 | 76.0 | 3.6 | 17.3 |
| 100 | 0.0 | | 0.7 | 34.6 | 75.0 | 74.0 | 1.5 | 75.7 | 91.1 | 53.2 | 56.5 |
| 200 | 0.0 | 0.6 | 19.5 | 53.1 | 89.6 | 80.6 | | 88.0 | 92.6 | | |
| 500 | 0.0 | | 41.2 | 68.6 | 91.0 | | | | | 80.4 | |
| 1000 | 0.0 | 30.6 | | | | | | | | | |

Figure 4:
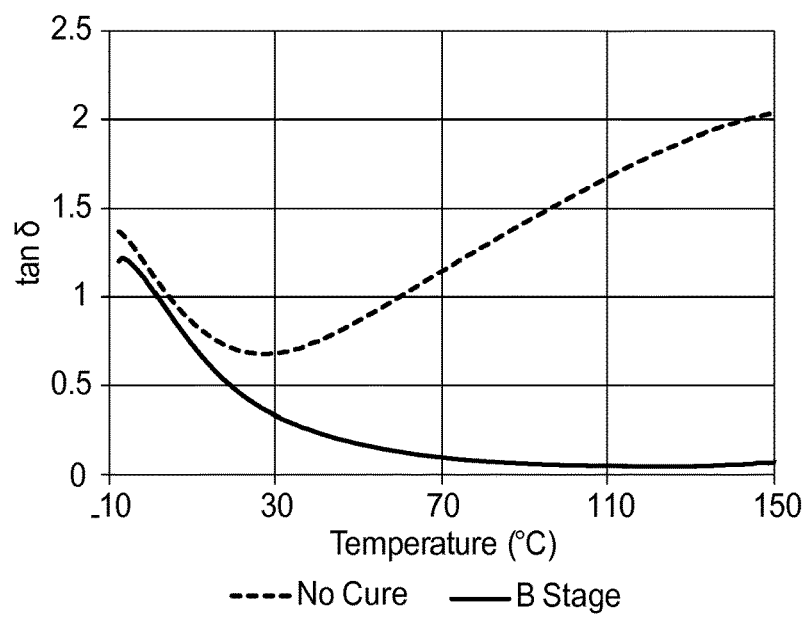
FIG. 4 is a graph illustrating the tan delta of an adhesive of the present disclosure as the temperature varies with no cure and after fully curing (B stage).

Method Used for Dynamic Mechanical Analysis for FIGS. 3-5

The examples were analyzed by Dynamic Mechanical Analysis (DMA) using an AR2000X parallel plate rheometer (TA Instruments) to characterize the physical properties of each sample as a function of temperature. Rheology samples were prepared by drying the adhesive on a silicone release liner at 160° C. in a vacuum oven into an adhesive film approximately 1 mm thick. After cooling back to room temperature, films were then punched out with an 8 mm circular die, removed from the release liner, centered between 8 mm diameter parallel plates of the rheometer, and compressed until the edges of the sample were uniform with the edges of the top and bottom plates. The furnace doors that surround the parallel plates and shafts of the rheometer were shut and the temperature was cooled to −20° C. and held for 3 minutes. The temperature was then ramped from −20° C. to 180° C. at 3° C./min while the parallel plates were oscillated at an angular frequency of 1 radian per second and a constant strain of 10 percent. While many physical parameters of the material are recorded during the temperature ramp, shear storage modulus (G'), shear loss modulus (G"), and tan delta are of primary importance in the characterization of the copolymers of this invention.

The glass transition temperature, $T_g$, of the adhesive composition can be measured by first determining its storage (G') and loss shear moduli (G"). The ratio of G"/G', a unit less parameter typically denoted "tan delta", is plotted versus temperature. The maximum point (point where the slope is zero) in the transition region between the glassy region and the rubbery region of the tan delta curve, if well defined, determines the Tg of the adhesive composition at that particular frequency.

The tan delta value at temperatures substantially above Tg is indicative of the degree of curing of the polymers. The more thoroughly cured the polymer system, the lower the tan delta value will be at these elevated temperatures.

This method was used to measure the DMA response of Example 1 and 2A at various cure levels and compiled into a single graph depicting tan delta versus temperature response at those different cure levels. Example 1 was used for FIG. 4, Example 2A was used for FIG. 3, and Examples 3B and 6A were used for FIG. 5. A lower starting temperature (−40° C.) was used for FIG. 5 in order to capture the Tg of Example 3B.

Evaluation of Adhesives

Samples were coated onto 2 mil (1 mil is equal to 0.001 inches) thick and 6 inch wide primed PET (3SAB available from the Mitsubishi company) using a knife coater with an 11 mil gap and then dried in a forced air oven at 70° C. for 30 minutes. Two 0.5 inch wide samples were slit in parallel in the down-web direction and laminated to 0.125 inch thick float glass and rolled with a 2.0 kg rubber roller with 2 passes before being UV cured.

PSA samples were cured at room temperature using a fusion lamp equipped with a D-bulb and exposed to 500 mJ/cm$^2$ UV-A through the float glass. Heat activated PSAs were first heated in a forced air oven for 10 minutes at 80° C., then quickly transferred to a carrier tray, and then passed under the fusion bulb for curing.

Additional select samples were cured through the float glass under black light at either 200 mJ/cm$^2$ or 500 mJ/cm$^2$ UV-A. The PSA sample was cured at room temperature on a raised stage, whereas the heat activated sample was cured on a hot plate set at 80° C. and allowed to equilibrate at that temperature for 5 minutes before being exposed to UV light.

For each test, 0.5 inch width of the adhesive coated sheet material approximately 6 inches long was cut from the coated adhesive. The free end of the coated strip was doubled back so that the angel of removal was 180 degrees. The free end was attached to the horizontal arm of the adhesion tester scale. The float glass coupon was then affixed to the metal platform of the instrument which is mechanized to move at a controlled rate (12 inches/minute) away from the scale. The scale reading in grams was read during the test as an average of both the peak and minimum forces during the peel. Three peel tests were run for each sample and averaged to yield the peel adhesion value listed in the table. Heat activated PSAs (and a reference PSA sample) were pre-conditioned on a hot plate set to 80° C. and allowed to warm there for 10 minutes prior to testing. Actual test measurements occurred at lower temperatures as a result of heat loss to the metal testing platform and radiation to the air; the measurements were conducted with due haste to minimize this heat loss. The results are in Table 5 below. In this table, "RT" refers to room temperature and "N/A" means the sample was not analyzed or no data could be obtained from the analysis.

TABLE 5

| | | | Peel Adhesion | | | |
|---|---|---|---|---|---|---|
| Ex. | Cure Temp. (° C.) | Light Source | Cure Dose (mJ/cm$^2$) | Conditioning Temp. (° C.) | Peel (grams/0.5 in.) | Failure Mode |
| 11 | RT | D-bulb | 0 | RT | 1591 | Cohesive |
| 11 | RT | D-bulb | 0 | 80 | 1384 | Cohesive |
| 11 | RT | Black light | 200 | RT | 1159 | Cohesive to Adhesive |
| 11 | RT | Black light | 200 | 80 | 908 | Cohesive to 2-bond |
| 11 | RT | Black light | 500 | RT | 852 | Adhesive |
| 11 | RT | Black light | 500 | 80 | 1320 | Adhesive |
| 11 | RT | D-bulb | 500 | RT | 908 | Adhesive |
| 15A | RT | D-bulb | 0 | RT | 741 | Adhesive |
| 15A | RT | D-bulb | 0 | 80 | 1584 | Adhesive |
| 15A | 80 | Black light | 200 | RT | 1082 | Adhesive |
| 15A | 80 | Black light | 200 | 80 | 928 | Adhesive |

TABLE 5-continued

Peel Adhesion

| Ex. | Cure Temp. (° C.) | Light Source | Cure Dose (mJ/cm²) | Conditioning Temp. (° C.) | Peel (grams/0.5 in.) | Failure Mode |
|---|---|---|---|---|---|---|
| 15A | 80 | Black light | 500 | RT | 1320 | Adhesive |
| 15A | 80 | Black light | 500 | 80 | 1323 | Adhesive |
| 15A | 80 | D-bulb | 500 | 80 | 1198 | Adhesive |
| 20 | 80 | D-bulb | 500 | 80 | N/A | Shocky, backing broke |
| 21 | 80 | D-bulb | 500 | 80 | 95 | Shocky |
| 22 | 80 | D-bulb | 500 | 80 | 1687 | Shocky |
| 12 | RT | D-bulb | 500 | 80 | 786 | Adhesive |
| 23 | RT | D-bulb | 500 | 80 | 820 | Adhesive |
| 14A | 80 | D-bulb | 500 | 80 | 1453 | Adhesive |
| 16A | 80 | D-bulb | 500 | 80 | 1238 | Adhesive |
| 17A | 80 | D-bulb | 500 | 80 | 1185 | Adhesive |
| 18A | 80 | D-bulb | 500 | 80 | 1161 | Adhesive |
| 19A | 80 | D-bulb | 500 | 80 | 1293 | Adhesive |

Examples 20-22 had the highest Tg values of all of the samples tested resulting in shocky peel and poor data acquisition. The peel adhesive values, most likely, would be more stable and accurate if tested at a higher temperature, at a lower peel speed, or both.

Compatibility Study of Example 5A with Bare ITO (Indium Tin Oxide) Trace

The compatibility of the adhesive of Example 5A with the ITO trace was evaluated. A sample of the 75 micron thick, dry adhesive was laminated to a 50 micron thick, primed polyester film (SH 81 primed PET available from DuPont (Wilmington, Del.)) backing to form a tape. The tape was then laminated to a PET film having a major surface coated with ITO traces, such that the adhesive was in direct contact with the traces to form a laminate. That is, the adhesive layer was positioned between the traces and a primed PET film.

Each test strip had five 19 cm long ITO traces, with each trace terminated in carbon connector pads. An initial surface resistance of about 60 Ohm/square was measured across the ITO trace using an ohm meter with the electrical leads of the meter placed across the connector pads. The adhesive covered the ITO traces but not the connector pads, and the resulting laminate was conditioned in an oven set at 65° C. and 90% relative humidity. A sample of the bare ITO film was included as a control (i.e. no adhesive tape laminated over the trace). The surface resistance for each sample was measured periodically over a period up to 500 hours (~21 days) using an ohm meter. An average of five surface resistance measurements was recorded. From this average, the percent change in resistance was calculated using the following formula where X is the time of the measurement.

% Resistance change=100×(resistance at time $X$–resistance at time zero)/resistance at time zero One of the experimental adhesive samples was tested without further UV exposure; the other was given 50 mJ/cm2 of UV black light (low intensity UV) after lamination to the ITO test strip. The results are shown in Table 6.

TABLE 6

Resistance Change versus time

| Example | Initial | 1 Day | 4 Days | 7 Days | 300 hours | 500 hours |
|---|---|---|---|---|---|---|
| Control | 0.0% | −3.2% | −3.0% | 0.5% | 6.1% | 11.1% |
| Example 5A (0 mJ/cm²) | 0.0% | −2.5% | −1.5% | 0.9% | 6.0% | 11.8% |

TABLE 6-continued

Resistance Change versus time

| Example | Initial | 1 Day | 4 Days | 7 Days | 300 hours | 500 hours |
|---|---|---|---|---|---|---|
| Example 5A (50 mJ/cm²) | 0.0% | −1.3% | 1.9% | 6.2% | 11.4% | 15.9% |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. An article comprising:
an adhesive layer that has a sheet format that is dimensionally stable at room temperature (no adhesive squeeze out or oozing at room temperature), the adhesive layer being flowable at temperatures in a range of 40-80 degrees Celsius, the adhesive layer comprising (meth)acrylate copolymer having pendant (meth)acryloyl groups and optional pendant hydroxyl groups, wherein the (meth)acrylate copolymer is partially cured (greater than 5 percent but less than 75 percent of the pendant (meth)acryloyl groups have been reacted) and wherein the (meth)acrylate copolymer, prior to curing, has a weight average molecular weight of 50,000 Daltons to 600,000 Daltons and an average molecular weight between (meth)acryloyl groups equal to at least 16,000 Daltons and wherein the (meth)acrylate copolymer that is partially cured has unreacted (meth)acryloyl groups available for additional latent curing; and
a first release liner, wherein the adhesive layer is positioned adjacent to the first release liner.

2. The article of claim 1 wherein the adhesive layer is optically clear.

3. The article of claim 1 wherein the (meth)acrylate copolymer having pendant (meth)acryloyl groups and optionally pendant hydroxyl groups is prepared from monomers comprising one or more (meth)acrylic ester monomers and one or more copolymerizable polar monomers.

4. The article of claim 1 wherein the adhesive layer further comprises a free radical initiator that is a photoinitiator.

5. The article of claim 1 wherein the article is a transfer tape.

6. The article of claim 1 wherein the (meth)acrylate copolymer has a tan δ of at least 0.5, as measured at a temperature of 60° C. and with an angular frequency of 1 Radian/second.

7. The article of claim 1 wherein the average molecular weight between (meth)acryloyl groups equal to at least 20,000 Daltons.

8. The article of claim 1 wherein the adhesive layer is positioned between two release liners.

9. The article of claim 1 wherein the article is an intermediate article that is stored prior to additional curing.

10. The article of claim 9 wherein the adhesive layer is further die-cut or slit prior to additional curing.

11. The article of claim 1 wherein the adhesive layer is an intermediate layer that is die-cut or slit and then stored prior to additional curing during the assembly process of an electronic display.

12. The article of claim 1 wherein the (meth)acrylate copolymer is a reaction product of a precursor (meth)acrylate copolymer having pendant hydroxyl groups and an unsaturated reagent compound having an isocyanato, epoxy, or anhydride group.

13. The article of claim 12 wherein the precursor (meth)acrylate copolymer comprises a reaction product of a polymerizable composition comprising at least 50 weight percent (meth)acrylic ester monomer, up to 30 weight percent copolymerizable polar monomers having a hydroxyl group, and up to 10 weight percent of a third monomer selected from (meth)acrylamide, N-isopropyl (meth)acrylamide, N,N-dimethyl (meth)acrylamide, N-octyl acrylamide, N,N-dimethylaminoethyl methacrylate, N-vinyl pyrrolidone, N-morpholino acrylate, diacetone (meth)acrylamide, N-vinyl lactams, vinyl acetate, and styrene.

14. The article of claim 1 wherein the (meth)acrylate copolymer is free of acid groups.

* * * * *

UNITED STATES PATENT AND TRADEMARK OFFICE
CERTIFICATE OF CORRECTION

PATENT NO. : 10,287,463 B2
APPLICATION NO. : 14/442178
DATED : May 14, 2019
INVENTOR(S) : Ross E. Behling Page 1 of 2

It is certified that error appears in the above-identified patent and that said Letters Patent is hereby corrected as shown below:

In the Drawings

Sheet 2 of 3
FIG. 3, Delete "(°C)" and insert -- (°C) --, therefor.

In the Specification

Column 7
Line 62, Delete "of the of the" and insert -- of the --, therefor.

Column 13
Line 67, Delete "ethylenoxide" and insert -- ethylene oxide --, therefor.

Column 14
Line 4, Delete "PPA 6" and insert -- PPA6 --, therefor.

Column 15
Line 15, Delete "2-hydroxethyl" and insert -- 2-hydroxyethyl --, therefor.
Line 32, Delete "Atofina Chemical, Inc." and insert -- Atofina Chemicals, Inc. --, therefor.
Line 50, Delete "LUCERIN-TPO-L" and insert -- LUCIRIN-TPO-L --, therefor.

Column 16
Line 41, Delete "isooctylthioglycoate," and insert -- isooctylthioglycolate, --, therefor.

Column 24
Line 57, Delete "(LUCERIN-TPO-L)" and insert -- (LUCIRIN-TPO-L) --, therefor.

Column 25
Lines 6 and 7, Delete "Atofina Chemical, Inc." and insert -- Atofina Chemicals, Inc. --, therefor.
Line 31, Delete "Fauske and Associated Inc." and insert -- Fauske and Associates Inc. --, therefor.

Signed and Sealed this
Twenty-second Day of October, 2019

Andrei Iancu
*Director of the United States Patent and Trademark Office*

Line 60, Delete "(LUCERIN-TPO-L)" and insert -- (LUCIRIN-TPO-L) --, therefor.

Column 26
Lines 26, 37, 38, 45, 46, 55 and 56, Delete "(LUCERIN-TPO-L)" and insert -- (LUCIRIN-TPO-L) --, therefor.

Column 27
Lines 46 and 51, Delete "LUCERIN-TPO-L" and insert -- LUCIRIN-TPO-L --, therefor.

Column 28
Lines 34 and 35, Delete "LUCERIN-TPO-L" and insert -- LUCIRIN-TPO-L --, therefor.

Column 29
Lines 15, 20 and 64, Delete "LUCERIN-TPO-L" and insert -- LUCIRIN-TPO-L --, therefor.

Column 30
Lines 2, 7, 12 and 61, Delete "LUCERIN-TPO-L" and insert -- LUCIRIN-TPO-L --, therefor.

Column 31
Line 48, Delete "LUCERIN-TPO-L" and insert -- LUCIRIN-TPO-L --, therefor.

Column 32
Line 21, Delete "LUCERIN-TPO-L" and insert -- LUCIRIN-TPO-L --, therefor.

Column 33
Lines 7 and 63, Delete "LUCERIN-TPO-L" and insert -- LUCIRIN-TPO-L --, therefor.

Column 34
Line 44, Delete "LUCERIN-TPO-L" and insert -- LUCIRIN-TPO-L --, therefor.

Column 36
Lines 3, 11, 25, 33, 47 and 55, Delete "LUCERIN-TPO-L" and insert -- LUCIRIN-TPO-L --, therefor.

Column 37
Line 8, Delete "LUCERIN-TPO-L" and insert -- LUCIRIN-TPO-L --, therefor.

In the Claims

Column 45
Line 17, In Claim 8, delete "claim 1" and insert -- claim 1, --, therefor.
Line 19, In Claim 9, delete "claim 1" and insert -- claim 1, --, therefor.
Line 21, In Claim 10, delete "claim 9" and insert -- claim 9, --, therefor.

Column 46
Line 1, In Claim 11, delete "claim 1" and insert -- claim 1, --, therefor.